(12) United States Patent
Tsuji

(10) Patent No.: US 9,070,082 B2
(45) Date of Patent: Jun. 30, 2015

(54) IMAGE FORMING APPARATUS AND IMAGE FORMING SYSTEM USING RESTRICTION INFORMATION

(71) Applicant: Oki Data Corporation, Tokyo (JP)

(72) Inventor: Yoshiaki Tsuji, Tokyo (JP)

(73) Assignee: Oki Data Corporation, Tokyo (JP)

( * ) Notice: Subject to any disclaimer, the term of this patent is extended or adjusted under 35 U.S.C. 154(b) by 3 days.

(21) Appl. No.: 13/903,158

(22) Filed: May 28, 2013

(65) Prior Publication Data
US 2013/0321850 A1    Dec. 5, 2013

(30) Foreign Application Priority Data
May 29, 2012 (JP) .................................. 2012-122218

(51) Int. Cl.
*G06K 15/00* (2006.01)
*G06F 3/12* (2006.01)
*G06F 21/60* (2013.01)
*H04N 1/00* (2006.01)

(52) U.S. Cl.
CPC .......... *G06K 15/4095* (2013.01); *G06F 3/1288* (2013.01); *G06F 3/1208* (2013.01); *G06F 21/608* (2013.01); *G06F 2221/2117* (2013.01); *H04N 1/00413* (2013.01); *H04N 2201/3205* (2013.01); *H04N 2201/3273* (2013.01); *G06F 3/1222* (2013.01); *G06F 3/1238* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 2008/0180703 A1* | 7/2008 | Yamada | 358/1.9 |
| 2008/0259388 A1* | 10/2008 | Sawaguchi | 358/1.15 |
| 2009/0174900 A1* | 7/2009 | Shigehisa et al. | 358/1.15 |
| 2011/0242569 A1* | 10/2011 | Ohara | 358/1.13 |

FOREIGN PATENT DOCUMENTS

JP    2008-129749 A    6/2008

* cited by examiner

*Primary Examiner* — Miya J Cato
(74) *Attorney, Agent, or Firm* — Muncy, Geissler, Olds & Lowe, P.C.

(57) ABSTRACT

An image forming apparatus includes a job receiving part that is configured to receive a job for image formation, an image generating part that is configured to perform an image generation process based on the job received by the job receiving part, a restriction information holding part that is configured to hold restriction information to restrict the image generation process, and a restriction information judging part that is configured to execute an analyzing/judging process in which whether or not the image generation process is allowed is determined by analyzing whether or not specific information is contained in the job based on the restriction information held in the restriction information holding part.

17 Claims, 30 Drawing Sheets

Fig. 6

| Printing Restriction Message | Restriction Method | New Addition |
|---|---|---|
| Printing Prohibited | Unprintable | Y |
| Confidential | Administrator's Judgment | |

Fig. 9

| User PC IP Address | User Login Name | Job Name | Print Date/Time | Print.Restrict. Message | Image Form. App. IP Add. |
|---|---|---|---|---|---|
| iii.jjj.kkk.lll | rrrrr | qqq.txt | 201y/mm/dd hh:mm:ss | Confidential | aaa.bbb.ccc.ddd |

111, 112, 113, 114, 115, 116, 110

IMAGE FORMING APPARATUS AND IMAGE FORMING SYSTEM USING RESTRICTION INFORMATION

CROSS REFERENCE TO RELATED APPLICATION

The present application is related to, claims priority from and incorporates by reference Japanese Patent Application No. 2012-122218, filed on May 29, 2012.

FIELD OF TECHNOLOGY

The present invention relates to an image forming apparatus such as a copier, printer, facsimile machine and the like, and an image forming system equipped with the image forming apparatus, and especially to a technology for judging whether to allow image formation based on the presence of specific information in a job for image formation.

BACKGROUND

As described in JP Laid-Open Patent Application No. 2008-129749, a conventional image forming apparatus and an image forming system accumulate image data after performing printing, facsimile transmission, or the like, and judges whether a restriction message is contained in the image data. If no restriction message is contained, the image data is registered to the search index, and if a restriction message is contained, the image data is not registered to the search index. Therefore, even if a user executes a search, image data containing a restriction message cannot be accessed. Accordingly, confidential information is prevented from being leaked.

However, in the conventional image forming apparatus and image forming system, although the presence of restriction message is judged for accumulated image data, the presence of a restriction message is not judged before forming the image. Therefore, there are cases where confidential information leaked.

SUMMARY

An image forming apparatus disclosed in the application includes a job receiving part that is configured to receive a job for image formation, an image generating part that is configured to perform an image generation process based on the job received by the job receiving part, a restriction information holding part that is configured to hold restriction information to restrict the image generation process, and a restriction information judging part that is configured to execute an analyzing/judging process in which whether or not the image generation process is allowed is determined by analyzing whether or not specific information is contained in the job based on the restriction information held in the restriction information holding part.

According to the above image forming apparatus, before generating an image based on a job for image formation, it is analyzed as to whether specific information is contained in the above-mentioned job, and a judgment is made as to whether to allow image generation, which can more securely prevent confidential information from being leaked compared with conventional methods.

BRIEF DESCRIPTION OF THE DRAWINGS

FIG. 6 is a diagram showing an example of a printing restriction information list held in the printing restriction information holding part in FIG. 1.

FIG. 9 is a diagram showing a content example of the administrator judgment notice sent to the administrator PC from the image forming apparatus in FIG. 2.

DETAILED DESCRIPTION

Forms of implementing the present invention will become clear by reading the following explanations on preferred embodiments while referring to the accompanying drawings. However, the drawings are only for the purpose of explanation and do not limit the scope of the present invention.

First Embodiment

Construction of First Embodiment

Figure 2:
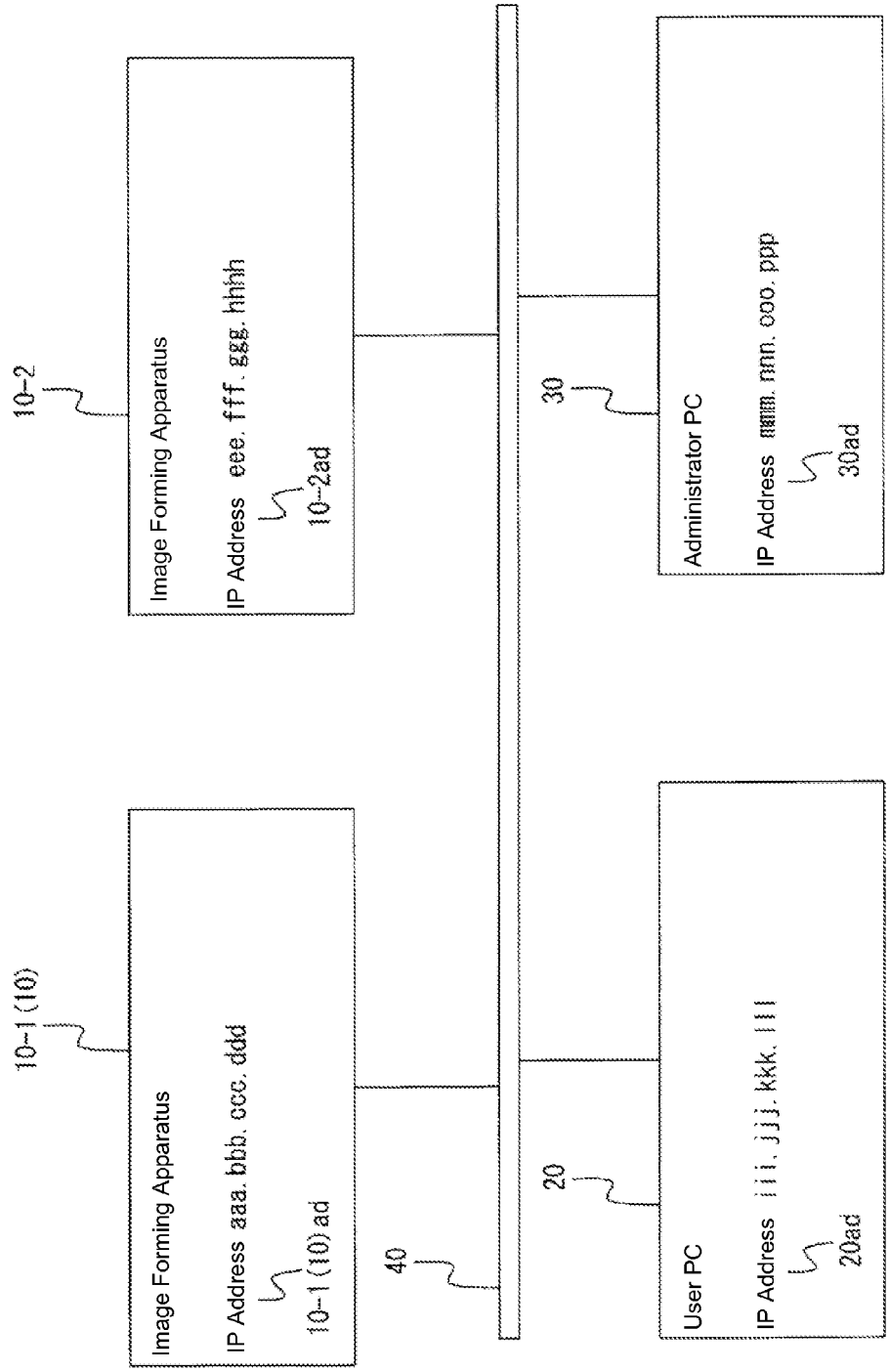
FIG. 2 is a block diagram showing the outline of an image forming system in the first embodiment of the present invention.

FIG. 2 is a block diagram showing the outline of an image forming system in a first embodiment of the present invention.

The image forming system of the first embodiment has multiple image forming apparatuses 10 (=10-1, 10-2), a user personal computer (hereafter called "PC") 20 as a first information processor which selects one of the multiple image forming apparatuses 10-1 and 10-2 and sends a job for image formation (such as a print job) to the selected image forming device 10, and an administrator PC 30 as a second information processor which manages the entire image forming system. Internet protocol (IP) address 10ad (=10-1ad, 10-2ad), 20ad, and 30ad are assigned to the image forming apparatus 10, user PC 20, and administrator PC 30, respectively, which are mutually connected via a network 40.

Each of the IP addresses 10ad, 20ad, and 30ad is a number for identifying each instrument connected to the network 40 and displayed by arranging four sets of 3-digit decimal numbers. For example, the image forming apparatus 10-1 is assigned with "aaa.bbb.ccc.ddd" as the IP address 10-1ad. In a similar manner, the image forming apparatus 10-2 is assigned with "eee.fff.ggg.hhh" as the IP address 10-2ad, the user PC 20 with "iii.jjj.kkk.lll" as the IP address 20ad, and the administrator PC 30 with "mmm.nnn.ooo.ppp" as the IP address 30ad.

Figure 1:
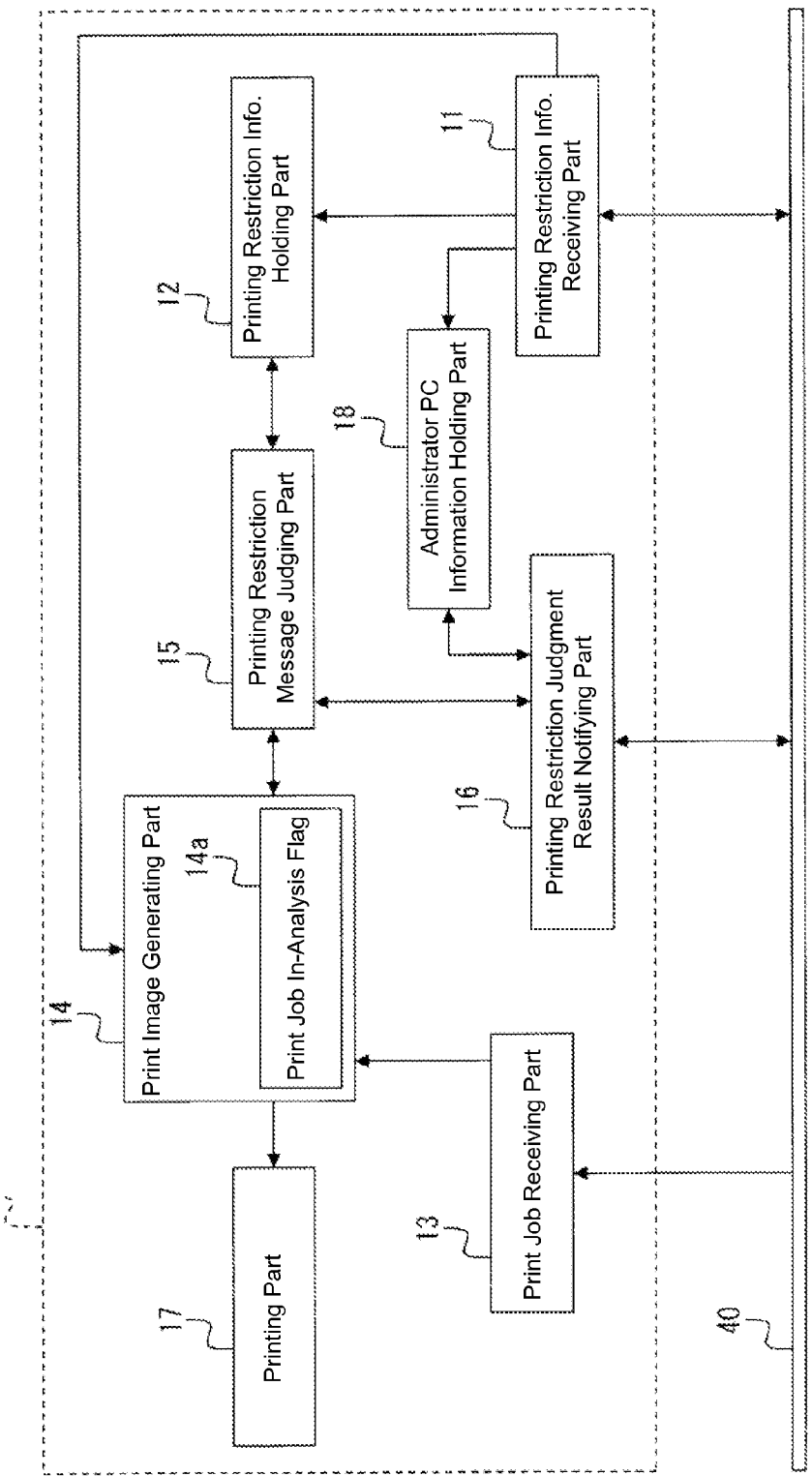
FIG. 1 is a block diagram showing an image forming apparatus in FIG. 2 in a first embodiment of the present invention.
Figure 3:
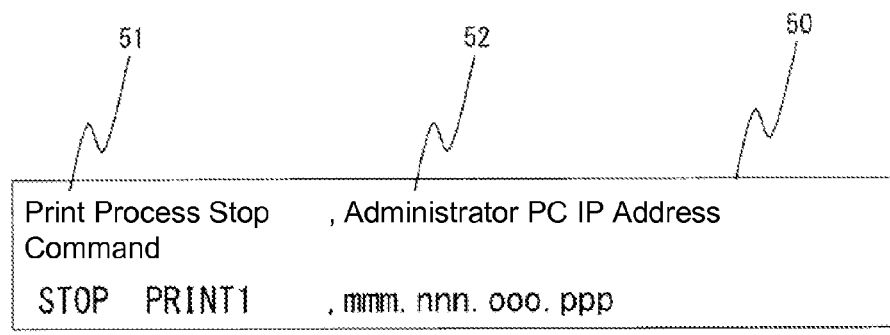
FIG. 3 is a diagram showing a content example of a print process stop notice sent to the image forming apparatus from the administrator personal computer (PC) in FIG. 2.
Figure 4:
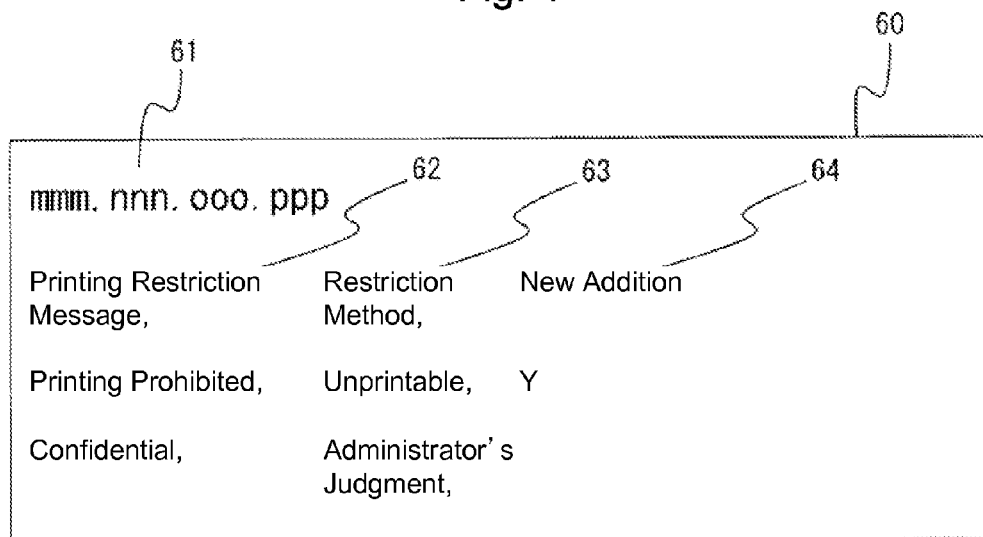
FIG. 4 is a diagram showing a content example of a printing restriction message notice sent to the image forming apparatus from the administrator PC in FIG. 2.
Figure 5:
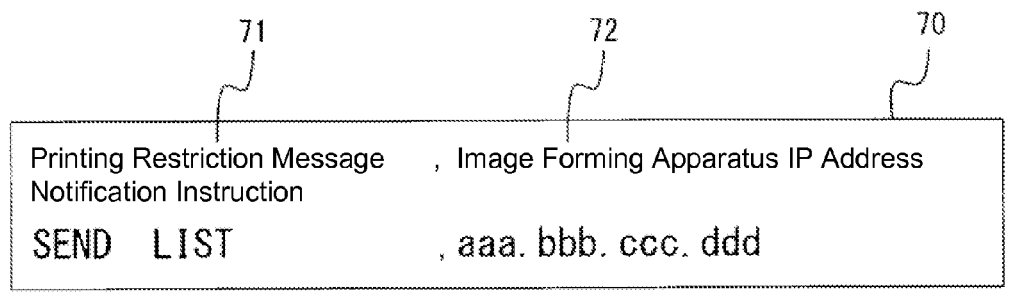
FIG. 5 is a diagram showing a content example of a printing restriction message notification request sent to the administrator PC from the image forming apparatus in FIG. 2.

FIG. 1 is a block diagram showing the image forming apparatus 10 in FIG. 2 in the first embodiment of the present invention. FIG. 3 is a diagram showing a content example of a print process stop notice 50 sent to the image forming apparatus 10 from the administrator PC 30 in FIG. 2. FIG. 4 is a diagram showing a content example of a printing restriction message notice 60 sent to the image forming apparatus 10 from the administrator PC 30 in FIG. 2. FIG. 5 is a diagram showing a content example of a printing restriction message notification request 70 sent to the administrator PC 30 from the image forming apparatus 10 in FIG. 2. FIG. 6 is a diagram showing an example of a printing restriction information list 80 held in the printing restriction information holding part 12 in FIG. 1.

Figure 7:
FIG. 7 is a diagram showing a print job in the first embodiment of the present invention.
Figure 8:
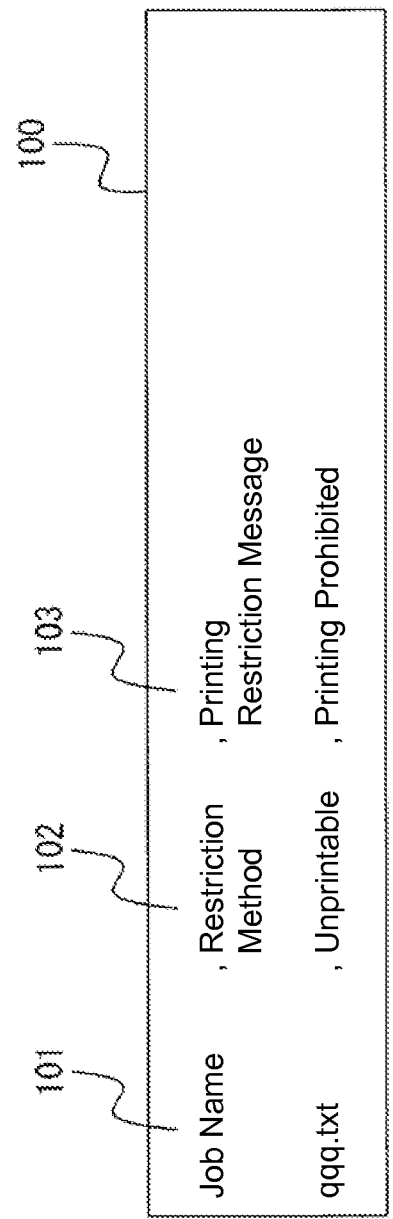
FIG. 8 is a diagram showing a content example of a user printing restriction notice sent to a user PC from the image forming apparatus in FIG. 2.
Figure 10:
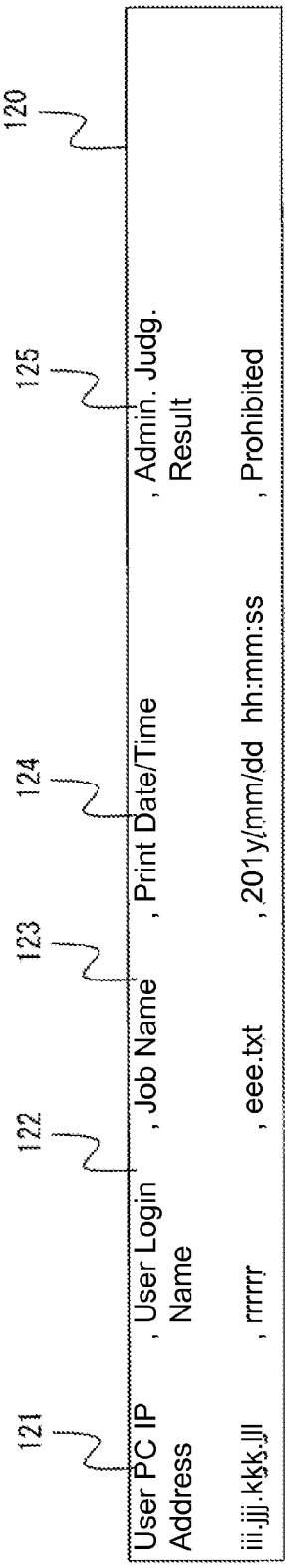
FIG. 10 is a diagram showing a content example of the administrator judgment results notice sent to the image forming apparatus from the administrator PC in FIG. 2.
Figure 11:
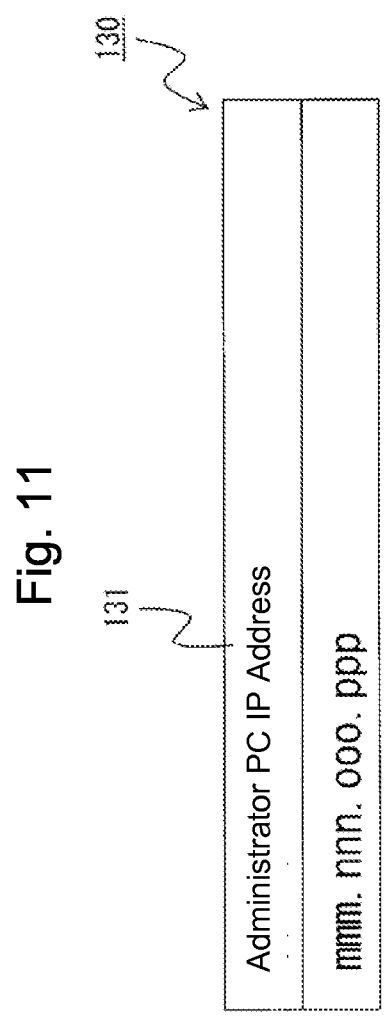
FIG. 11 is a diagram showing an example of the administrator PC list held in the administrator PC information holding part in FIG. 1.

FIG. 7 is a diagram showing a print job 90 in the first embodiment of the present invention. FIG. 8 is a diagram showing a content example of a user printing restriction notice 100 sent to the user PC 20 from the image forming apparatus 10 in FIG. 2. FIG. 9 is a diagram showing a content example of an administrator judgment notice 110 sent to the administrator PC 30 from the image forming apparatus 10 in FIG. 1. FIG. 10 is a diagram showing a content example of an administrator judgment results notice 120 sent to the image forming apparatus 10 from the administrator PC 30 in FIG. 2. Further, FIG. 11 is a diagram showing an example of the administrator PC list 130 held in the administrator PC information holding part 18 in FIG. 1.

The construction of the image forming apparatus 10 will be explained using FIG. 1 while referring to FIGS. 3-11.

The image forming apparatus 10 is an electrophotographic color page printer and has a printing restriction information receiving part 11 as the restriction information receiving part, a printing restriction information holding part 12 as the restriction information holding part, a print job receiving part 13 as the job receiving part, a print image generating part 14 as the image generating part, a printing restriction message judging part 15 as the restriction information judging part, a printing restriction judgment result notifying part 16 as the judgment result notifying part, a printing part 17, and an administrator PC information holding part 18. The print image generating part 14 has a print job in-analysis flag 14a having "Off state" as its default value.

The printing restriction information receiving part 11 has a function to receive a print process stop notice 50 shown in FIG. 3 sent from the administrator PC 30, to send a printing restriction message notification request 70 shown in FIG. 5 to the administrator PC 30 after the print process is stopped, and to receive a printing restriction message notice 60 as the restriction information.

The print process stop notice 50 is a command for pausing an image forming process (such as a print process) in the image forming apparatus 10 and has a print process stop command 51 having a fixed message "STOP PRINT1" and the administrator PC IP address 52 (such as mmm.nnn.ooo.ppp) as shown in FIG. 3.

The printing restriction message notice 60 has the administrator PC IP address 61 (such as mmm.nnn.ooo.ppp) of the sending source, a printing restriction message 62 (such as Printing Prohibited and Confidential), a restriction method 63 (such as Unprintable and Administrator's Judgment), and a new addition 64 which indicates with "Y" that a restriction message 62 is newly added to the printing restriction information holding part 12 as shown in FIG. 4. The printing restriction message notification request 70 has a printing restriction message notification instruction 71 having a fixed message "SEND LIST" and the image forming apparatus IP address 72 as shown in FIG. 5.

The printing restriction information holding part 12 has a function to hold information on the printing restriction message 62, the restriction method 63, and the new addition 64 inside the printing restriction message notice 60 received by the printing restriction information receiving part 11 in the format of the printing restriction information list 80. The printing restriction information list 80 has a printing restriction message 81, a restriction method 82, and a new addition 83 as shown in FIG. 6.

The print job receiving part 13 has a function to receive a print job 90 sent from the user PC 20. As shown in FIG. 7, the print job 90 has a job name 91 (such as qqq.txt), a user PC IP address 92 (such as iii.jjj.kkk.lll), a user login name 93 (such as rrrrrr), a print date/time 94 (201y/mm/dd hh:mm:ss), and print data 95.

The print image generating part 14 has a function to perform a process of generating print images of the print job 90 received in the print job receiving part 13 and request printing of the generated print images to the printing part 17. Further, the print image generating part 14 stops the image generation process of the print job 90 when the printing restriction information receiving part 11 has received a print process stop notice 50.

The printing restriction message judging part 15 has a function to judge whether the printing restriction message 81 registered in the printing restriction information list 80 held in the printing restriction information holding part 12 exists in the print data 95 in the print job 90.

The printing restriction judgment result notifying part 16 has a function to send a user printing restriction notice 100 showing the judgment result of the printing restriction message judging part 15 to the user PC 20 and send an administrator judgment notice 110 showing the judgment result to the administrator PC 30.

As shown in FIG. 8, the user printing restriction notice 100 has a job name 101 (such as qqq.txt), a restriction method 102 (such as Unprintable) and a printing restriction message 103 (such as Printing Prohibited). As shown in FIG. 9, the administrator judgment notice 110 has a user PC IP address 111 (such as iii.jjj.kkk.lll), a user login name 112 (such as rrrrrr), a job name 113 (such as qqq.txt), a print date/time 114 (such as 201y/mm/dd hh:mm:ss), a printing restriction message 115 (such as Confidential), and an image forming apparatus IP address 116 (such as aaa.bbb.ccc.ddd).

Further, the printing restriction judgment result notifying part 16 has a function to notify the printing restriction message judging part 15 of the content of the administrator judgment results notice 120 sent from the administrator PC 30 and to send the content of the administrator judgment results notice 120 as the user printing restriction notice 100 to the user PC 20.

As shown in FIG. 10, the administrator judgment results notice 120 has a user PC IP address 121 (such as iii.jjj.kkk.lll), a user login name 122 (such as rrrrrr), a job name 123 (such as eee.txt), a print date/time 124 (such as 201y/mm/dd hh:mm:ss), and an administrator judgment result 125 (such as Prohibited).

The printing part 17 has a function to print images generated by the print image generating part 14. The administrator PC information holding part 18 has a function to hold information of the administrator PC IP address 61 in the printing restriction message notice 60 received by the printing restriction information receiving part 11 in the format of the administrator PC list 130. As shown in FIG. 11, the administrator PC list 130 has an administrator PC IP address 131 (such as mmm.nnn.ooo.ppp).

Figure 12:
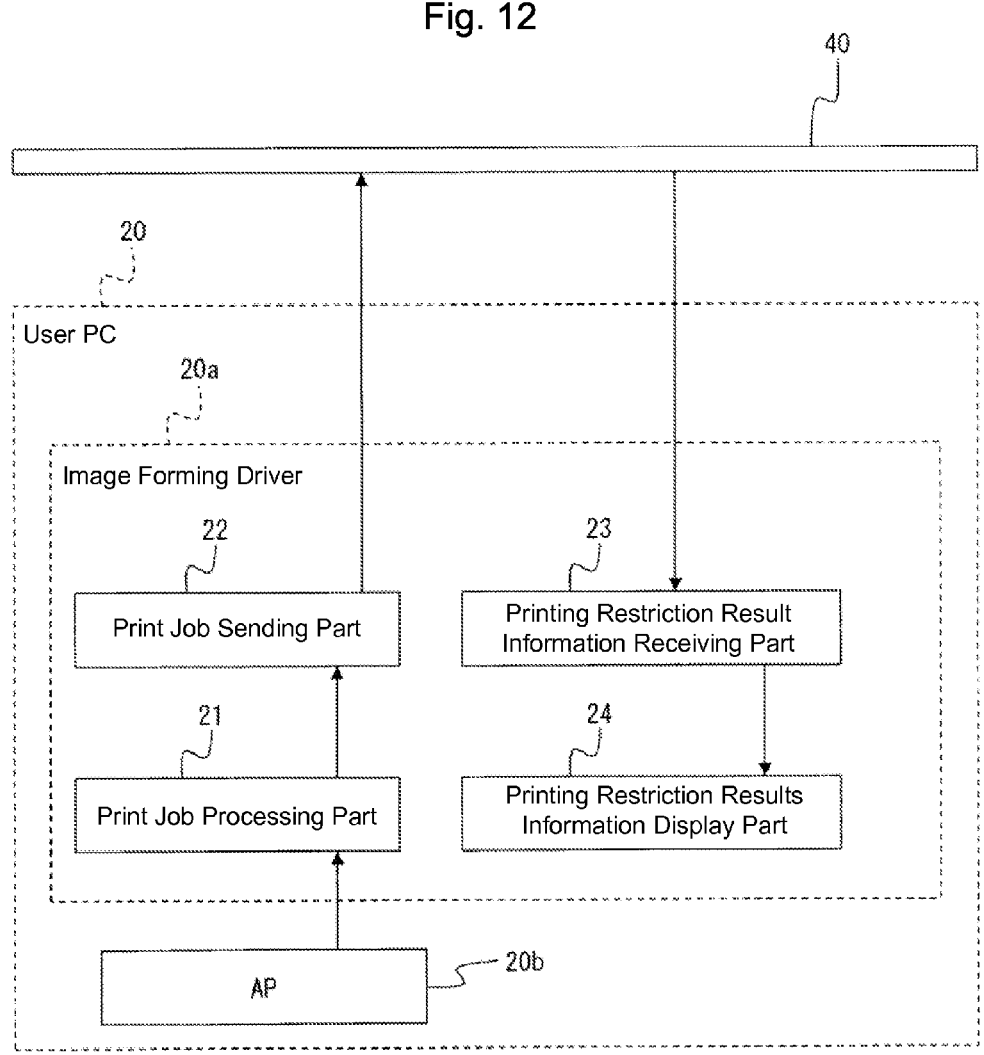
FIG. 12 is a block diagram showing a user PC in FIG. 2.
Figure 13:
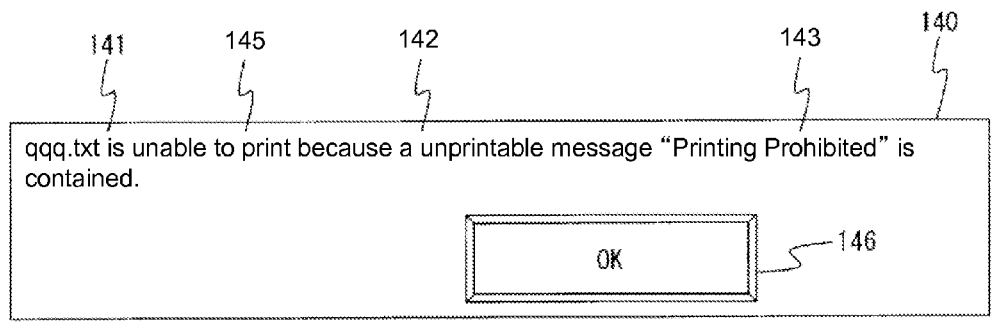
FIG. 13 is a diagram showing an example of the printing restriction results display screen displayed by the printing restriction results information display part in FIG. 12.

FIG. 12 is a block diagram showing the user PC 20 in FIG. 2. FIG. 13 is a diagram showing an example of the printing restriction results display screen 140 displayed by the printing restriction results information display part 24 in FIG. 12. Further, FIG. 14 is a diagram showing an example of the printing job printing restriction results display screen 150 displayed by the printing restriction results information display part 24 in FIG. 12.

Figure 14:
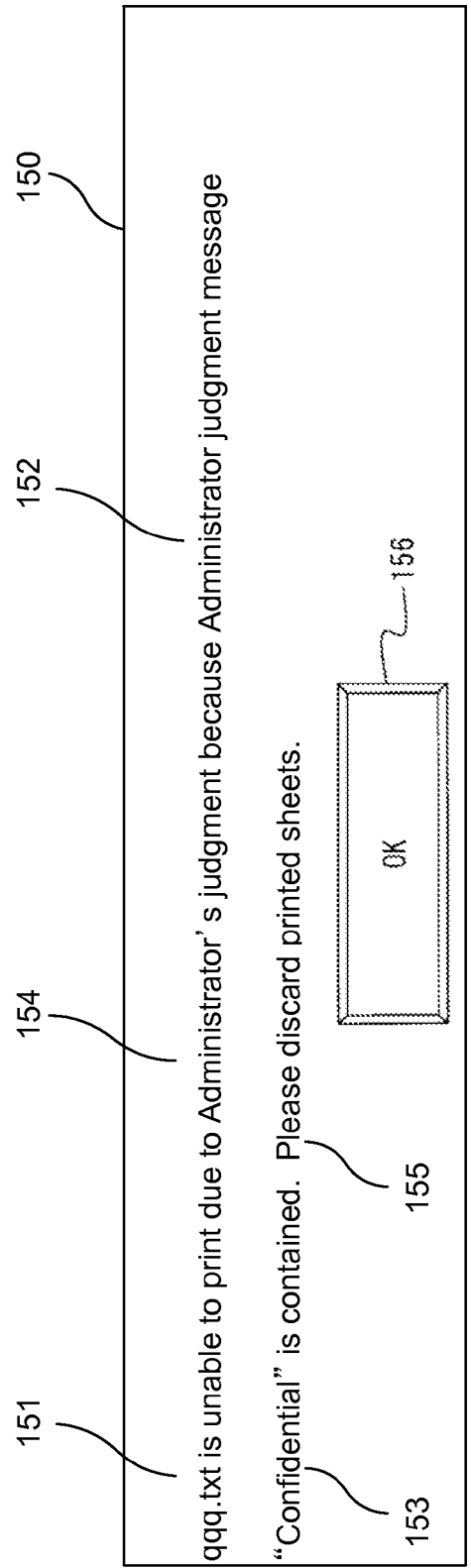
FIG. 14 is a diagram showing an example of the printing restriction results display screen displayed by the printing restriction results information display part in FIG. 12.

Referring to FIG. 13 and FIG. 14, the construction of the user PC 20 will be explained using FIG. 12.

The user PC 20 is comprised of an image forming driver 20a and an application program (hereafter called "AP") which is the subject of printing execution.

The image forming driver 20a has a print job processing part 21 as the job processing part which generates the print job 90 by processing target data, a print job sending part 22 as the job sending part which sends the print job 90 to the image forming apparatus 10, a printing restriction result information receiving part 23 as the judgment result receiving part which receives the user printing restriction notice 100 from the printing restriction judgment result notifying part 16, and a printing restriction results information display part 24 as the judgment result display part which displays a first message based on the judgment result.

The print job processing part 21 has a function to create a print job 90 based on a print request from AP 20b and to request the print job sending part 22 to send the print job 90. The print job sending part 22 has a function to send the print job 90 to the image forming apparatus 10.

The printing restriction result information receiving part 23 receives the user printing restriction notice 100 sent from the image forming apparatus 10. The printing restriction results information display part 24 has a function to display the printing restriction results display screen 140 or the printing restriction results display screen 150 based on information on the user printing restriction notice 100 received by the printing restriction result information receiving part 23. As shown in FIG. 13, the printing restriction results display screen 140 generates and displays messages 141-145 indicating Unprintable, and the process is terminated by having the OK button 146 pressed down. As shown in FIG. 14, the printing job printing restriction results display screen 150 generates and displays messages 151-155 indicating Unprintable, and the process is arranged to be terminated by having the OK button 156 pressed down.

Figure 15:
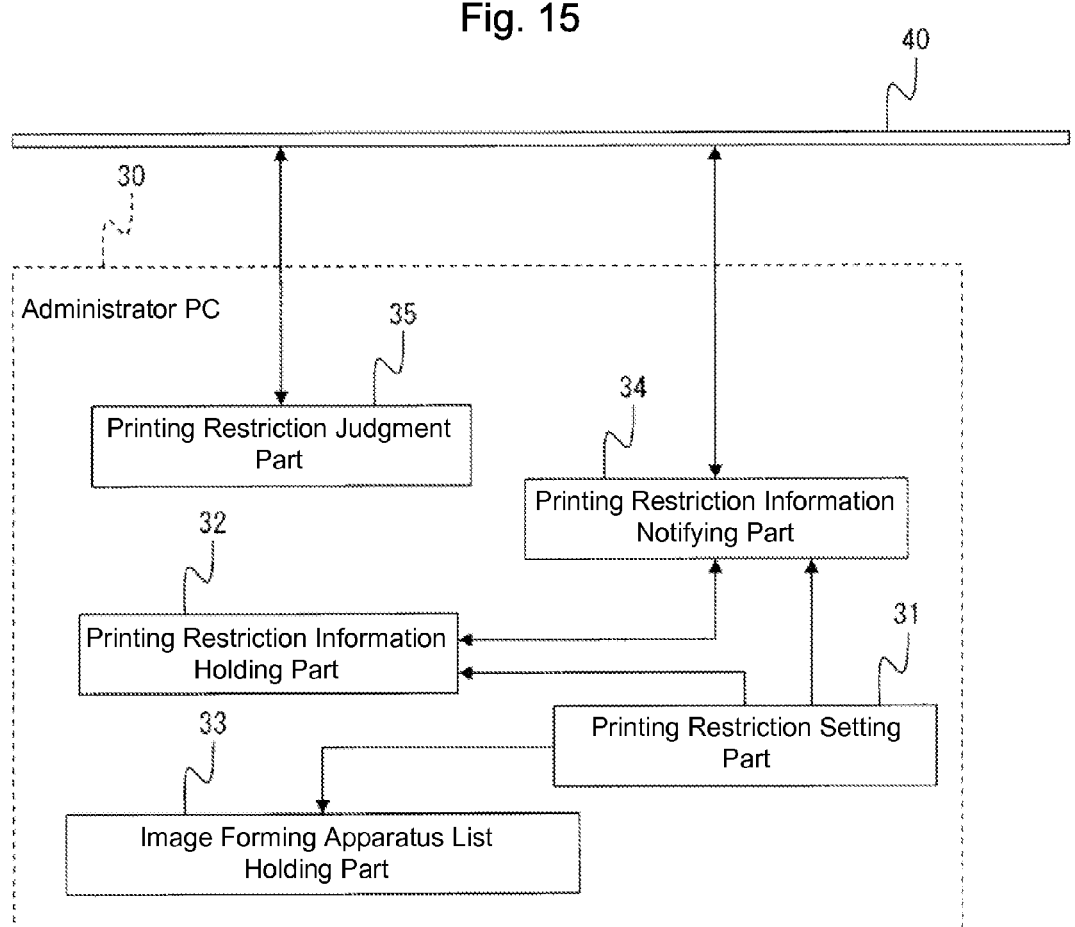
FIG. 15 is a block diagram showing the administrator PC in FIG. 2.
Figure 16:
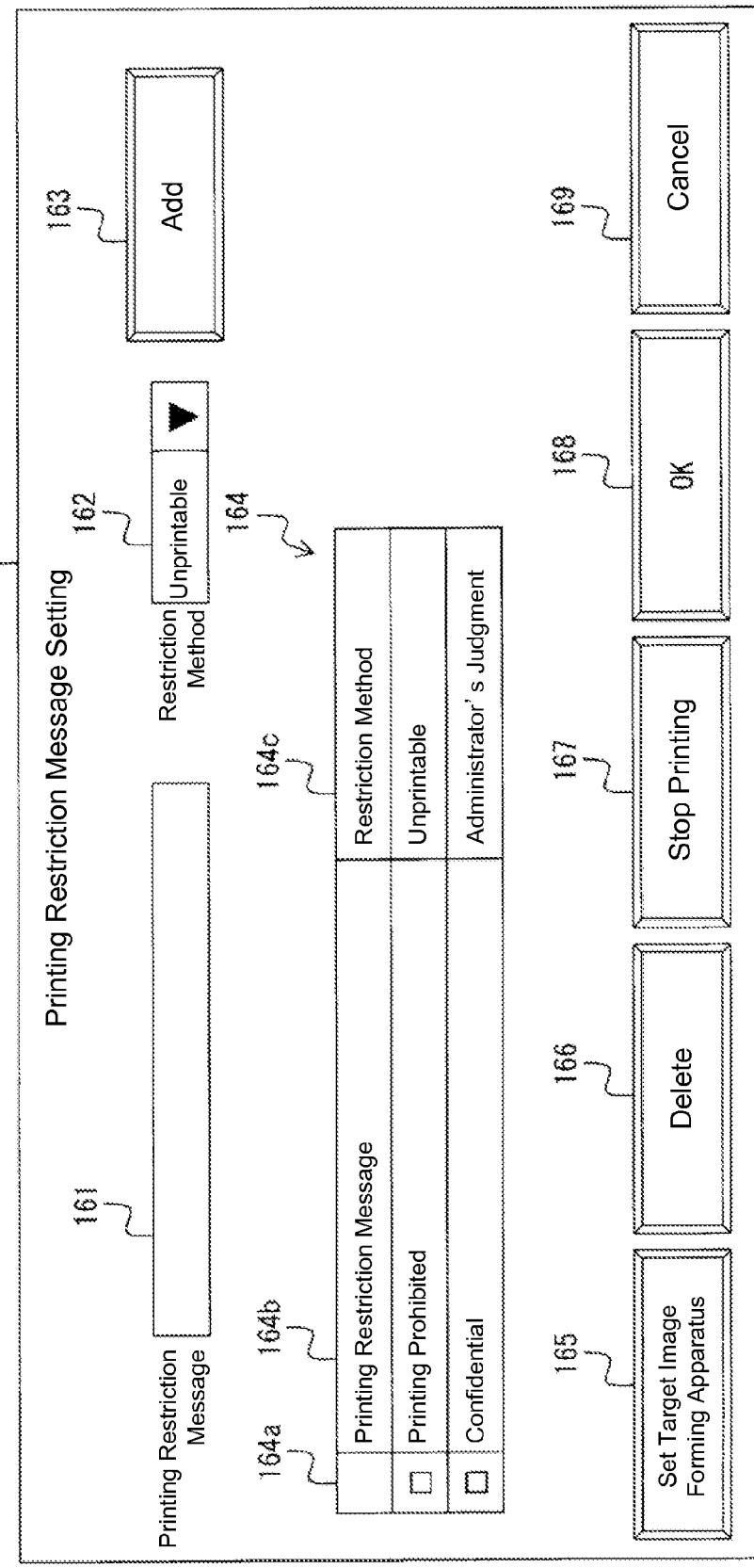
FIG. 16 is a diagram showing an example of the printing restriction message setting screen displayed by a printing restriction setting part in FIG. 15.
Figure 17:
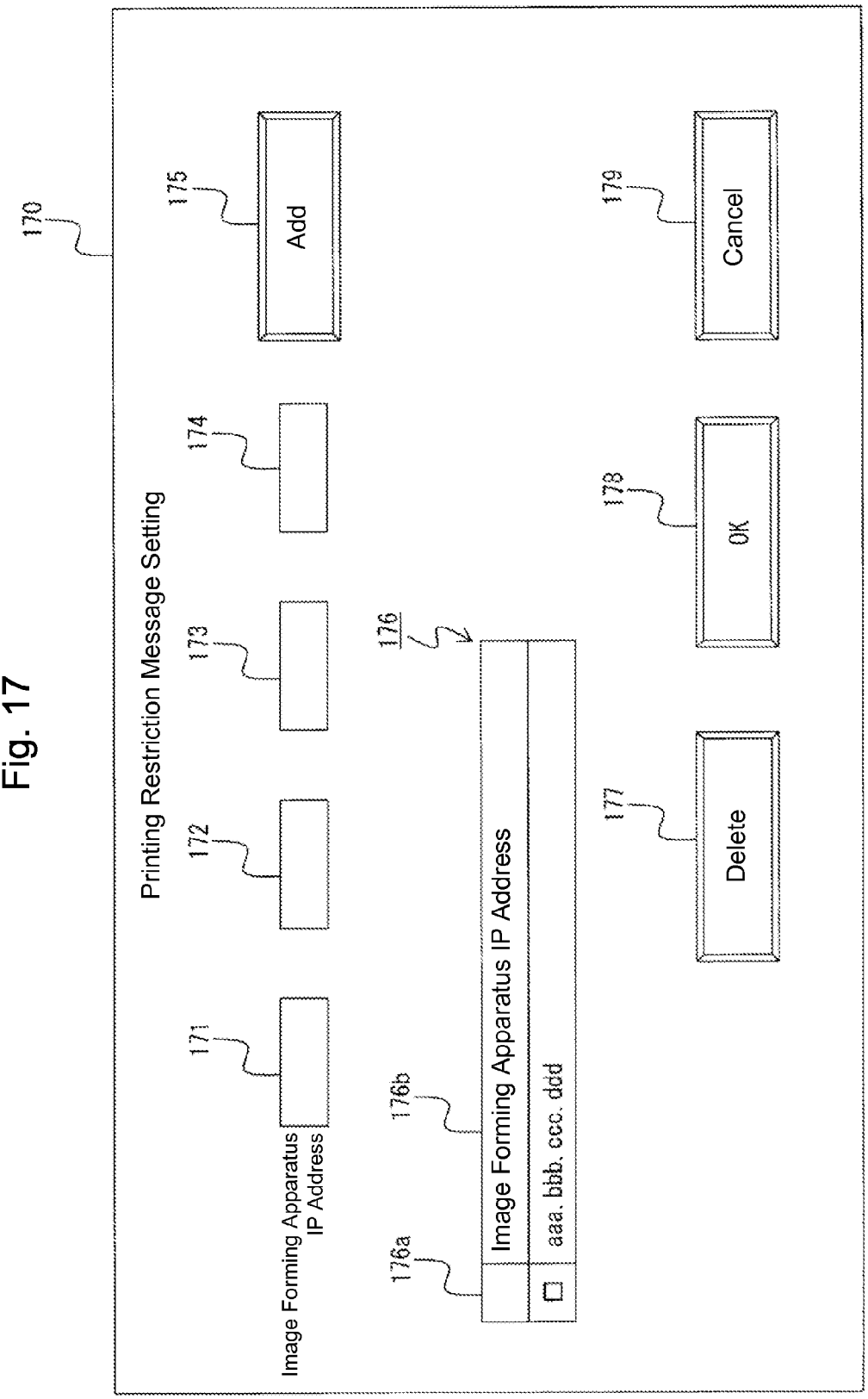
FIG. 17 is a diagram showing an example of the image forming apparatus list setting screen displayed by the printing restriction setting part in FIG. 15.
Figure 18:
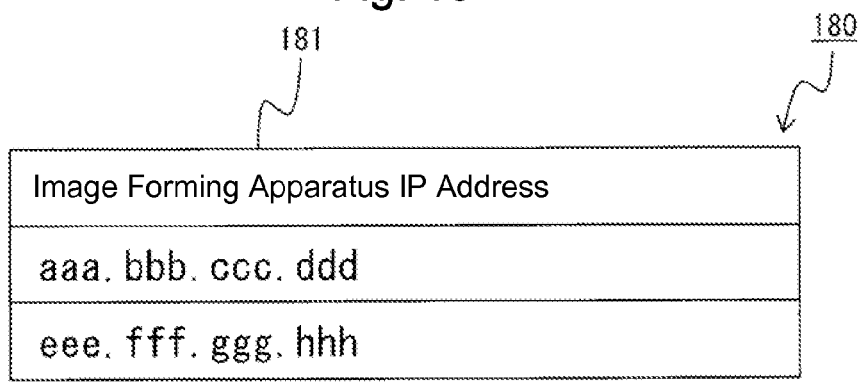
FIG. 18 is a diagram showing an example of the image forming apparatus list held by an image forming apparatus list holding part in FIG. 15.
Figure 19:
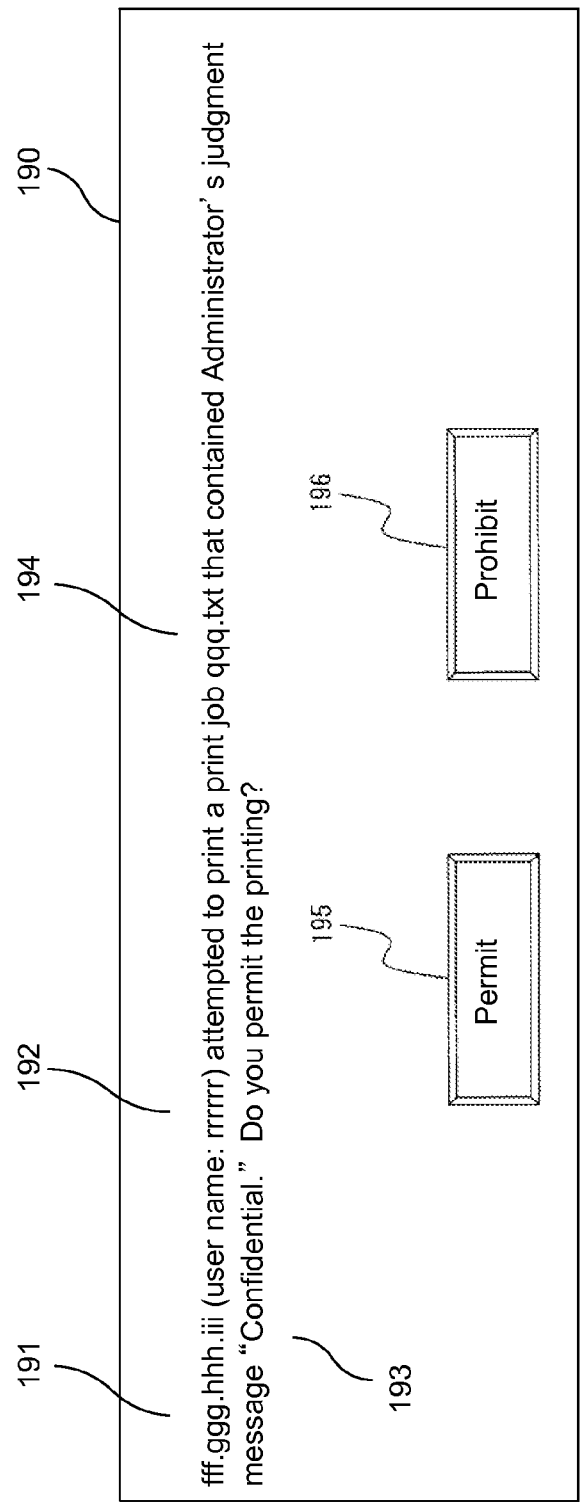
FIG. 19 is a diagram showing an example of the administrator judgment confirmation screen displayed by the printing restriction judging part in FIG. 15.

FIG. 15 is a block diagram showing the administrator PC 30 in FIG. 2. FIG. 16 is a diagram showing an example of the printing restriction message setting screen 160 displayed by a printing restriction setting part 31 in FIG. 15. FIG. 17 is a diagram showing an example of the image forming apparatus list setting screen 170 displayed by the printing restriction setting part 31 in FIG. 15. FIG. 18 is a diagram showing an example of the image forming apparatus list 180 held in the image forming apparatus list holding part 33 in FIG. 15. Further, FIG. 19 is a diagram showing an example of the administrator judgment confirmation screen 190 displayed by the printing restriction judgment part 35 in FIG. 15.

The construction of the administrator PC 30 will be explained using FIG. 15, referring to FIGS. 16-19.

The administrator PC 30 has a printing restriction setting part 31 as the restriction setting part, a printing restriction information holding part 32 as the restriction information holding part, an image forming apparatus list holding part 33, a printing restriction information notifying part 34 as the restriction information notifying part, and a printing restriction judgment part 35 as the restriction judgment part which receives a judgment result from the judgment result notifying part 16.

The printing restriction setting part 31 has a printing restriction message setting screen 160 shown in FIG. 16 and an image forming apparatus list setting screen 170 shown in FIG. 17 and has a function to set printing restriction messages by the printing restriction message setting screen 160 and to set a list of image forming apparatuses 10 to which the printing restriction messages by the image forming apparatus list setting screen 170.

As shown in FIG. 16, the printing restriction message setting screen 160 has a printing restriction message text box 161 for inputting printing restriction messages, a restriction method combo box 162 which is a pull-down menu having values of "Unprintable" and "Administrator's Judgment", an Add button 163, a printing restriction list 164, a Set Target Image Forming Apparatus button 165, a Delete button 166, a Stop Printing button 167, an OK button 168, and a Cancel button 169. The printing restriction list 164 has a check box 164a, a printing restriction message 164b, and a restriction method 164c.

As shown in FIG. 17, the image forming apparatus list setting screen 170 has a first octet text book 171, a second octet text box 172, a third octet text box 173, and a fourth octet text box 174 which respectively store first to fourth octets of the image forming apparatus IP address 10ad expressed in integers of 0 to 255, an Add button 175, an image forming apparatus list 176, a Delete button 177, an OK button 178, and a Cancel button 179. The image forming apparatus list 176 has a check box 176a and an image forming apparatus IP address 176b.

In FIG. 15, the printing restriction information holding part 32 has a function to hold the setting information of the printing restriction messages set by the printing restriction setting part 31 in the format of the printing restriction information list 80 shown in FIG. 6. The image forming apparatus list holding part 33 has a function to hold the setting information of the image forming apparatus 10 set by the printing restriction setting part 31 in the format of the image forming apparatus list 180 shown in FIG. 18. As shown in FIG. 18, the image forming apparatus list 180 has an image forming apparatus IP address 181 (such as aaa.bbb.ccc.ddd and eee.fff.ggg.hhh).

The printing restriction information notifying part 34 has a function to send a print process stop notice 50 and a printing restriction message notice 60 created based on a printing restriction information list 80 held in the printing restriction information holding part 32 to the image forming apparatus 10 set to the image forming apparatus IP address 181 of the image forming apparatus list 180 held in the image forming apparatus list holding part 33 when printing restriction messages are set by the printing restriction setting part 31.

The printing restriction judgment part 35 has a function to display an administrator judgment confirmation screen 190 shown in FIG. 19 from the content of an administrator judgment notice 110 shown in FIG. 9 sent from the image forming apparatus 10, create an administrator judgment results notice 120 based on the selection result in the administrator judgment confirmation screen 190, and send it to the image forming apparatus 10.

The administrator judgment notice 110 shown in FIG. 9 is a message for asking the administrator PC 30 whether the image forming apparatus 10 should prohibit image generation when a printing restriction message such as Confidential is contained in a print job 90 in the image forming apparatus 10.

(Actions of First Embodiment)

Figure 20:
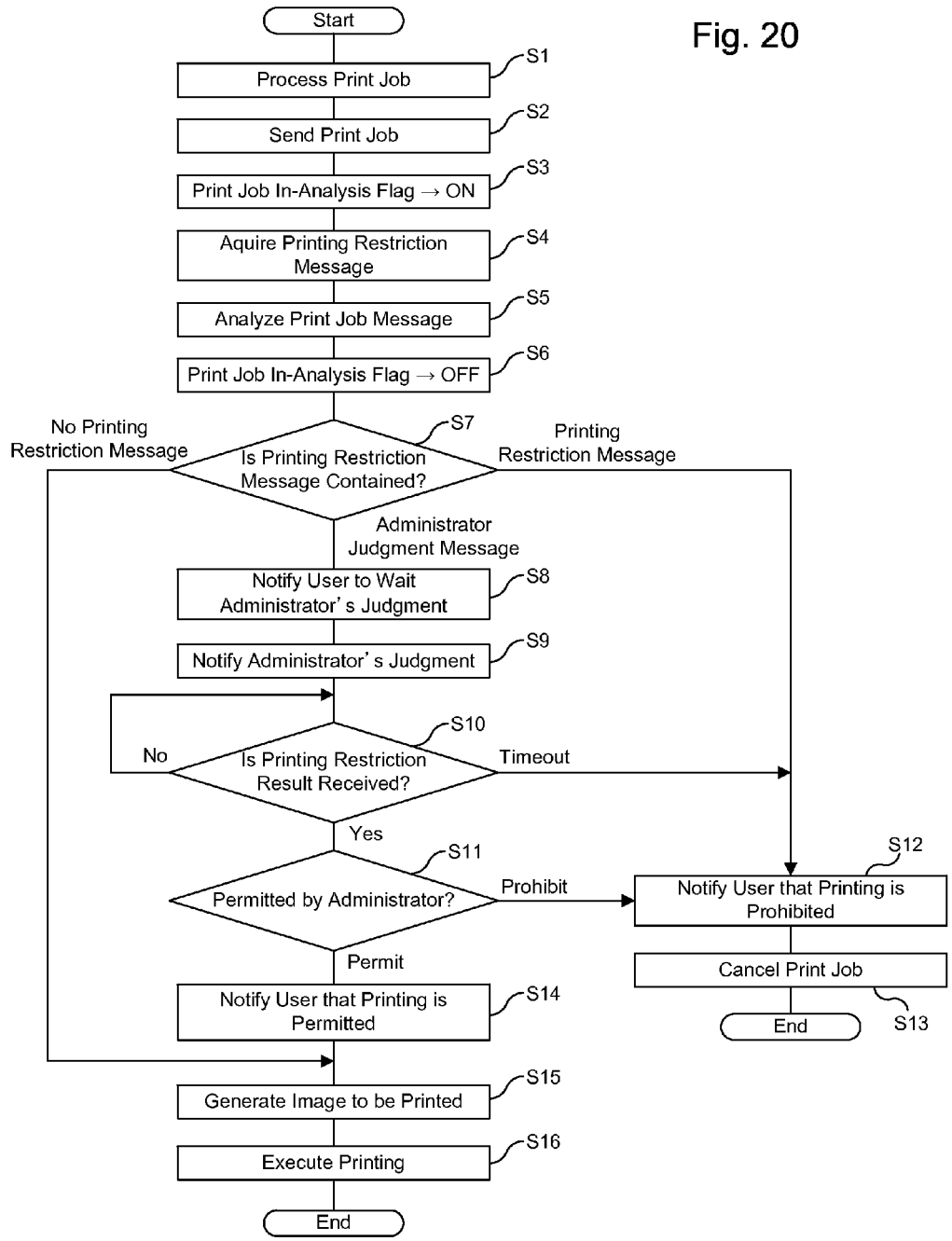
FIG. 20 is a flow diagram showing the print process actions of an image forming system in the first embodiment of the present invention.

FIG. 20 is a flow diagram showing the print process actions of an image forming system in the first embodiment of the present invention.

In S1, when printing execution is instructed from AP 20b of the user PC 20 to the image forming driver 20a, the print job processing part 21 generates a print job 90 in FIG. 7 comprised of a job name 91, a user PC IP address 92 with the IP address 20ad of the user PC 20 set, a user login name 93, a print date/time 94, and print data 95.

In S2, the generated print job 90 is sent to the print job receiving part 13 of the image forming apparatus 10 by the print job sending part 22. The print job receiving part 13 outputs the print job 90 to the print image generating part 14.

In S3, once the print job 90 is received, the print image generating part 14 sets the print job in-analysis flag 14a to "ON state" and requests the printing restriction message judging part 15 to analyze whether printing restriction messages are contained in the received print job 90.

In S4, the printing restriction message judging part 15 receives the request to analyze whether printing restriction messages are contained in the print job 90, acquires the printing restriction messages 81 shown in FIG. 6 from the printing restriction information holding part 12, and proceeds onto S5.

In S5, the printing restriction message judging part 15 executes a process of analyzing whether the printing restriction messages 81 acquired from the printing restriction information holding part 12 are contained in the print data 95 of the print job 90. Once the analyzing process is complete, the printing restriction message judging part 15 notifies the print image generating part 14 of the completion and proceeds onto S6. In S6, the print image generating part 14 sets the print job in-analysis flag 14a to "OFF state".

In S7, the printing restriction message judging part 15 judges the analysis result. As a result of the analysis, if printing restriction messages 81 are not contained in the print data 95 of the print job 90, the printing restriction message judging part 15 notifies the print image generating part 14 of the fact that the printing restriction messages 81 are not contained and proceeds onto S15.

In S15, the print image generating part 14 performs an image generation process of the print job 90 and requests the printing part 17 to print the generated image. In S16, the printing part 17 executes printing of the generated image.

In the S7, if the printing restriction messages 81 are contained in the print data 95 of the print job 90, and if the contained printing restriction messages 81 include one with the restriction method 82 set to "Unprintable", S12 is taken next.

In S12, the printing restriction message judging part 15 requests a printing restriction judgment result notifying part 16 to send a user printing restriction notice 100 shown in FIG. 8 to the user PC 20, and the printing restriction judgment result notifying part 16 creates the user printing restriction notice 100 by setting the job name 91 of the print job 90 to the job name 101 of the user printing restriction notice 100, "Unprintable" to the restriction method 102 of the user printing restriction notice 100, and the printing restriction messages 81 which are contained in the print data 95 of the print job 90 and have become "Unprintable" to a printing restriction message 103. The printing restriction judgment result notifying part 16 sends the user printing restriction notice 100 to the printing restriction result information receiving part 23 of the user PC 20 specified by the user PC IP address 92 of the print job 90.

The printing restriction result information receiving part 23 which has received the user printing restriction notice 100 requests the printing restriction results information display part 24 to display the content of the user printing restriction notice 100, and the printing restriction results information display part 24 sets the job name 11 of the user printing restriction notice 100 to the job name 141 on the printing restriction results display screen 140, the restriction method 102 to the restriction method 142, the printing restriction message 103 to the printing restriction message 143, and "Unable to Print" to the printing restriction result 145, respectively, and displays the printing restriction results display screen 140. The printing restriction results information display part 24 terminates the printing restriction results display screen 140 by having the OK button 146 pressed down.

The printing restriction message judging part 15 further notifies that a printing restriction message 81 which is "Unprintable" is contained in the print image generating part 14, and the print image generating part 14 cancels the print job 90.

In the S7, if the print data 95 of the print job 90 contains printing restriction messages 81 and the restriction method 82 corresponding to one of the contained printing restriction messages 81 is "Administrator's Judgment", S8 is taken.

In S8 the printing restriction message judging part 15 requests the printing restriction judgment result notifying part 16 to send the user judgment notice 100 shown in FIG. 8, the printing restriction judgment notifying part 16 creates the user printing restriction notice 100 by setting the job name 91 of the print job 90 to the job name 101 of the user printing restriction notice 100, "Administrator's Judgment" to the restriction method 102 of the user printing restriction notice 100, the printing restriction messages 81 which become "Administrator's Judgment" contained in the print data 95 of the print job 90 to the printing restriction message 103, respectively.

The printing restriction judgment result notifying part 16 sends the user printing restriction notice 100 to the printing restriction result information receiving part 23 of the user PC 20 specified by the user PC IP address 92 of the print job 90.

The printing restriction result information receiving part 23 which has received the user printing restriction notice 100 requests the printing restriction results information display part 24 to display the content of the user printing restriction notice 100.

The printing restriction results information display part 24 sets the job name 101 of the user printing restriction notice 100 to the job name 141 on the printing restriction results display screen 140, the restriction method 102 to the restriction method 142, the printing restriction message 103 to the printing restriction message 143, and "Please wait for the administrator's approval result." To the printing restriction result 145, respectively, and displays the printing restriction results display screen 140. The printing restriction results information display part 24 terminates the printing restriction results display screen 140 by having the OK button 146 pressed down.

In S9, the printing restriction judgment result notifying part 16 creates the administrator judgment notice 110 by setting the user PC IP address 92 of the print job 90 to user PC IP address 111 of the administrator judgment notice 110 shown in FIG. 9, the user login name 93 to the user login name 112, the job name 91 to the job name 113, the print & time date 94 to the print date/time 114, the printing restriction message 81 which became "Administrator's Judgment" contained in the print data 95 of the print job 90 to the printing restriction message 115, and the IP address 10ad of the image forming apparatus 10 to the image forming apparatus IP address 116, respectively.

The printing restriction judgment result notifying part 16 sends the created administrator judgment notice 110 to the printing restriction judgment part 35 of the administrator PC 30 specified by the administrator PC IP address 131 of the administrator PC list 130 shown in FIG. 11.

The printing restriction judgment part 35 which has received the administrator judgment notice 110 sets the user PC IP address 111 of the administrator judgment notice 110 to the user PC IP address 191 of the administrator judgment confirmation screen 190 shown in FIG. 19, the user login name 112 to the user login name 192, the printing restriction message 115 to the printing restriction message 193, and the job name 113 to the job name 194, respectively, and displays the administrator judgment confirmation screen 190.

On the administrator judgment confirmation screen 190, if a Permit button 195 or a Prohibit button 196 is pressed down, the printing restriction judgment part 35 terminates the administrator judgment confirmation screen 190, creates the administrator judgment results notice 120 by setting the user PC IP address 111 of the administrator judgment notice 110 to the user PC IP address 121 of the administrator judgment results notice 120 shown in FIG. 10, the user login name 112 to the user login name 122, the job name 113 to the job name 123, the print date/time 114 to the print date/time 124, and "Permit" if the Permit button 195 was pressed down or "Prohibit" if the Prohibit button was pressed down to the administrator judgment result 125, respectively, sends it to the printing restriction judgment result notifying part 16 of the image forming apparatus 10 specified by the image forming apparatus IP address 116 of the administrator judgment notice 110, and proceeds onto S10.

In S10, the printing restriction judgment result notifying part 16 checks whether the administrator judgment results notice 120 has been received. If the administrator judgment results notice 120 has been received (Yes), S11 is taken, and if the administrator judgment results notice 120 is not received even after a specified time has passed, S12 is taken.

In S11, the printing restriction judgment result notifying part 16 checks the administrator judgment result 125 of the administrator judgment results notice 120. If the administrator judgment result 125 of the administrator judgment results notice 120 is "Permit", S14 is taken.

In S14 the printing restriction judgment result notifying part 16 creates the user printing restriction notice 100 by setting the job name 91 of the print job 90 to the job name 101 of the user printing restriction notice 100 shown in FIG. 8, "Administrator's Judgment (Permit)" to the restriction method 102, and the printing restriction message 81 which has become "Administrator's Judgment" contained in the print data 95 of the print job 90 to the printing restriction message 103, respectively, sends the user printing restriction notice 100 to the printing restriction result information receiving part 23 of the user PC 20 specified by the user PC IP address 92 of the print job 90, and proceeds onto S15.

The printing restriction result information receiving part 23 which has received the user printing restriction notice 100 request the printing restriction results information display part 24 to display the content of the user printing restriction notice 100. The printing restriction information display part 24 sets the job name 101 of the user printing restriction notice 100 to the job name 141 of the printing restriction results display screen 140 shown in FIG. 13, "Administrator's Judgment" to the restriction method 142, the printing restriction message 103 to the printing restriction message 143, and "Administrator's permission is given, and printing is done." To the printing restriction result 145, respectively, and displays the printing restriction results display screen 140. The printing restriction results information display part 24 terminates the printing restriction results display screen 140 by having the OK button 146 pressed down.

In S11, if the administrator judgment result 125 of the administrator judgment results notice 120 is "Prohibit", S12 is taken.

In S12, the printing restriction judgment result notifying part 16 creates the user printing restriction notice 100 by setting the job name 91 of the print job 90 to the job name 101 of the user printing restriction notice 100 shown in FIG. 9, "Administrator's Judgment (Prohibit)" to the restriction method 102, and the printing restriction message 81 which has become "Administrator's Judgment" contained in the print data 95 of the print job 90 to the printing restriction message 103, respectively, and sends it to the printing restriction result information receiving part 23 of the user PC 20 specified by the user PC IP address 92 of the print job 90.

The printing restriction result information receiving part 23 which has received the user printing restriction notice 100 requests the printing restriction results information display part 24 to display the content of the user printing restriction notice 100. The printing restriction results information display part 24 sets the job name 101 of the user printing restriction notice 100 to the job name 151 of the printing restriction results display screen 150 shown in FIG. 14, sets "Administrator's Judgment" to the restriction method 152, sets the printing restriction message 103 to the printing restriction message 153, and sets "Unable to print by the administrator's judgment." to the printing restriction result 154, respectively, and displays the printing restriction results display screen 150. The printing restriction results information display part 24 terminates the printing restriction results display screen 150 by having the OK button 156 pressed down, and proceeds onto S13. Processing in S13 is as described above.

In S10, if the printing restriction judgment result notifying part 16 has not received the administrator judgment results notice 120 within a certain period of time and timeout has occurred, S12 is taken. In S12, the printing restriction judgment result notifying part 16 creates the user printing restriction notice 100 and notifies the printing restriction result information receiving part 23 of the user PC 20 of timeout. The printing restriction result information receiving part 23 requests the printing restriction results information display part 24 to display the content of the user printing restriction notice 100. The printing restriction results information display part 24 displays a message "Administrator's judgment was not in time, and printing could not be performed due to timeout. Please try printing again."

Figure 21:
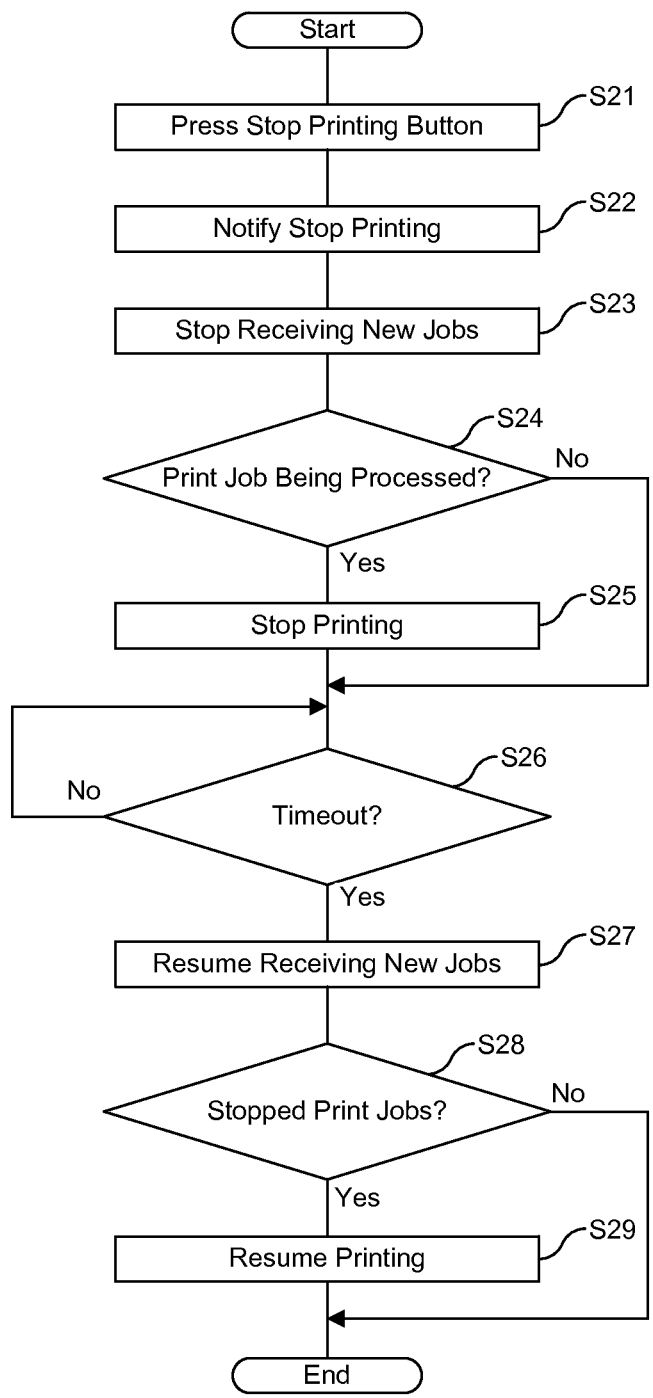
FIG. 21 is a flow diagram showing the actions of the image forming system in operating the printing restriction message setting screen in FIG. 16.

FIG. 21 is a flow diagram showing the actions of the image forming system in operating the printing restriction message setting screen 160 in FIG. 16.

When the printing restriction setting part 31 of the administrator PC 30 is started, the printing restriction message setting screen 160 is displayed. If the Add button 163 is pressed down, the value of the printing restriction message text box 161 is set to the printing restriction message 164b, and the value of the restriction method combo box 162 is set to the restriction method 164c, which are added to the printing restriction list 164 as a new line.

If the Set Target Image Forming Apparatus button 165 is pressed down, the image forming apparatus list setting screen 170 is displayed. If the Delete button 166 is pressed down, lines with the check box 164a checked are deleted in the printing restriction list 164.

In S21 in FIG. 21, if the Stop Printing button 167 is pressed down, the printing restriction setting part 31 requests the printing restriction information notifying part 34 to send the print process stop notice 50 and proceed onto S22. In S22, the printing restriction information notifying part 34 creates the print process stop notice 50 by setting the print process stop command 51 of the print process stop notice 50 to "STOP PRINT1", and the IP address 30ad of the administrator PC 30 to the administrator PC IP address 52.

The print process stop notice 50 is sent to the printing restriction information receiving parts 11 of all the image forming apparatuses 10 set at the image forming apparatus IP addresses 181 of the mage forming apparatus list 180 shown in FIG. 18 in the image forming apparatus list holding part 33.

In S23, the printing restriction information receiving part 11 which has received the print process stop notice 50 requests the print image generating part 14 to stop receiving new jobs, and the print image generating part 14 stops receiving new print jobs 90 and proceeds onto S24.

In S24, if there is a print job 90 being processed (Yes), the print image generating part 14 stops processing the print job 90 and proceeds onto S25. In S25, the print image generating part 14 notifies the printing restriction information receiving part 11 that the printing stop process has been completed, and proceeds onto S26.

In S26, the printing restriction information receiving part 11 confirms that the print process stop command 51 is "STOP PRINT1", and sets timeout if no new notice comes even after a certain period of time has passed after the printing stop process is complete (Yes), notifies the print image generating part 14 that timeout has occurred, and proceeds onto S27.

In S27, the print image generating part 14 resumes receiving new print jobs 90 and proceeds onto S28. In S28, if there are stopped print jobs 90 (Yes), print process of the stopped print job 90 is resumed in S29, and this process is finished.

In FIG. 16, if the OK button 168 is pressed down, the Add button 163, the Set Target Image Forming Apparatus button 165, the Delete button 166, the Stop Printing button 167, the OK button 168, and the Cancel button 169 are turned into a depression disabled state.

The printing restriction setting part 31 generates the printing restriction information list 80 of the printing restriction information holding part 32 by setting the printing restriction message 164b of the printing restriction list 164 to the printing restriction message 81 of the printing restriction information list 80 held in the printing restriction information holding part 32, setting the printing restriction message 164c to the restriction method 82, and setting "Y" to the new addition 83 if the printing restriction message 81 is not one of the messages previously set, respectively, and performs a printing restriction message setting modification process. When the printing restriction message setting modification process is complete, the printing restriction setting part 31 terminates the printing restriction message setting screen 160. If the Cancel button 169 is pressed down, the printing restriction setting part 31 terminates the printing restriction message setting screen 160.

Next, the actions of the image forming system in operating the image forming apparatus list setting screen 170 in FIG. 17 will be explained.

If the Set Target Image Forming Apparatus button 165 on the printing restriction message setting screen 160 in FIG. 16 is pressed down, the image forming apparatus list setting screen 170 in FIG. 17 is displayed. If the Add button 175 is pressed down, a new line is added to the image forming apparatus list 176, wherein the image forming apparatus IP address 176b is a value which has a value entered in the IP address first octet text box 171 as the first octet, a value entered in the IP address second octet text box 172 as the second octet, a value entered in the IP address third octet text box 173 as the third octet, and a value entered in the IP address fourth octet text box 174 as the fourth octet.

If the Delete button 178 is pressed down, lines with the check box 176a checked are deleted in the image forming apparatus list 176. If the OK button 178 is pressed down, the Add button 175, the Delete button 177, the OK button 178, and the Cancel button 179 are disabled. The printing restriction setting part 31 sets the image forming apparatus IP address 176b of the image forming apparatus list 176 to the image forming apparatus IP address 181 of the image forming apparatus list 180 shown in FIG. 18 in the image forming apparatus list holding part 33. By this, the image forming apparatus list 180 of the image forming apparatus list holding part 33 is generated, the image forming apparatus list setting screen 170 is terminated, and the printing restriction message setting screen 160 is displayed. If the Cancel button 179 is pressed down, the image forming apparatus list setting screen 170 is terminated, and the printing restriction message setting screen 160 is displayed.

Figure 22:
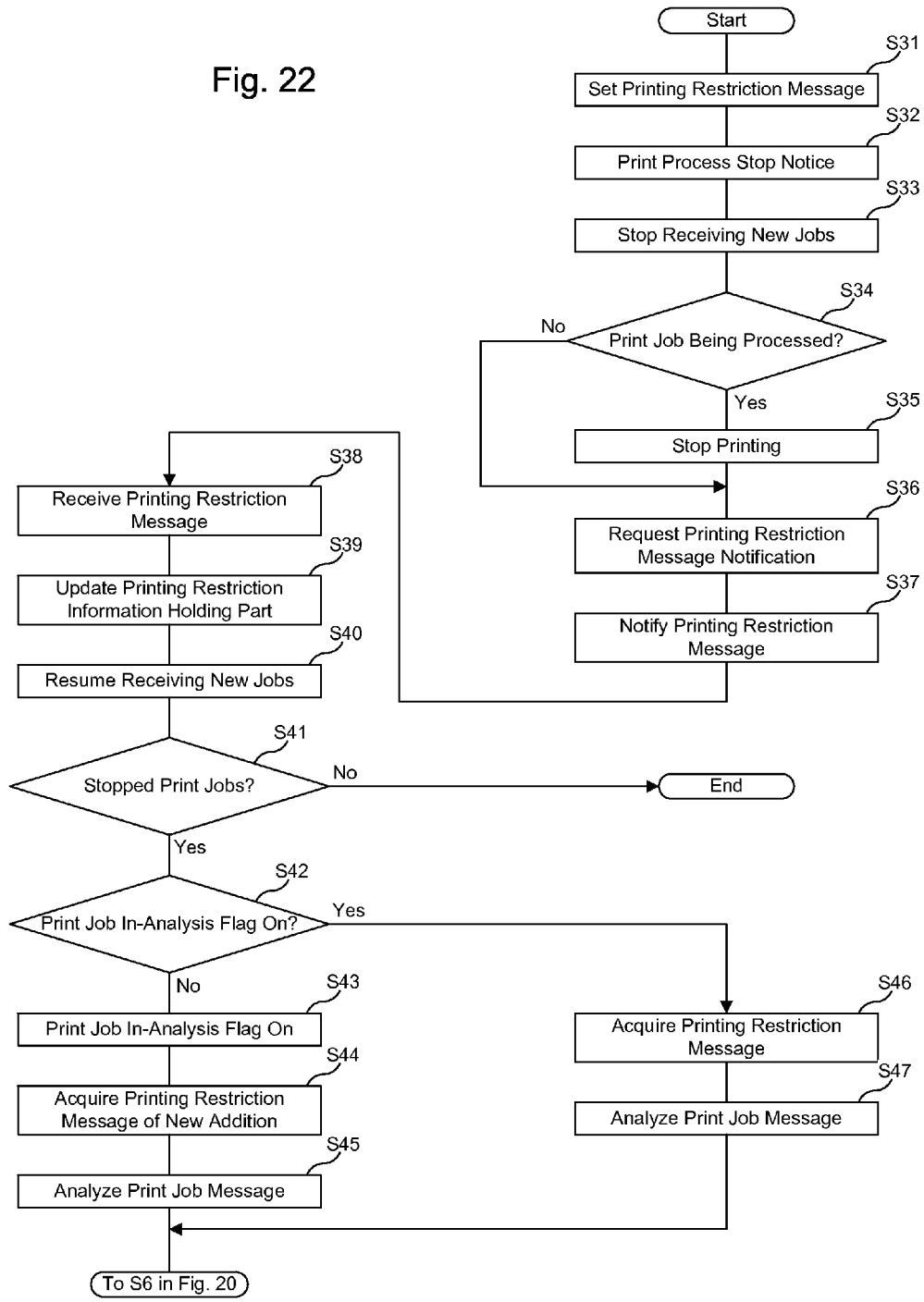
FIG. 22 is a flow diagram showing the actions in changing the printing restriction message setting of the image forming system in the first embodiment of the present invention.

FIG. 22 is a flow diagram showing the actions in changing the printing restriction message setting of the image forming system in the first embodiment of the present invention.

In S31, if the printing restriction setting part 31 is started and the printing restriction message setting change is performed, the printing restriction setting part 31 requests the printing restriction information notifying part 34 to send the print process stop notice 50 and proceeds onto S32.

In S32 the printing restriction information notifying part 34 creates the print process stop notice 50 by setting "STOP PRINT2" to the print process stop command 51 of the print process stop notice 50 shown in FIG. 3, and the IP address 30*ad* of the administrator PC 30 to the administrator PC IP address 52, respectively. The printing restriction information notifying part 34 sends the print process stop notice 50 to the printing restriction information receiving parts 11 of all the image forming apparatuses 10 that have been set at the image forming apparatus IP addresses 181 of the image forming apparatus list 180 in the image forming apparatus list holding part 33, and proceeds onto S33.

In S33 the printing restriction information receiving part 11 which has received the print process stop notice 50 requests the print image generating part 14 to stop accepting new jobs, and the print image generating part 14 stops accepting new print jobs 90 and proceeds onto S34.

In S34, if there are print jobs 90 in processing (Yes), the print image generating part 14 stops processing the print jobs 90 in S35 and proceeds onto S36.

In S36, the print image generating part 14 notifies the printing restriction information receiving part 11 that a printing stop process has been completed. The printing restriction information receiving part 11 confirms that the print process stop command 51 is "STOP PRINT2", and creates the printing restriction message notification request 70 by setting the IP address 10*ad* of the image forming apparatus 10 to the image forming apparatus IP address 72 of the printing restriction message notification request 70 shown in FIG. 5. The printing restriction information receiving part 11 sends the printing restriction message notification request 70 to the printing restriction information notifying part 34 of the administrator PC 30 specified by the administrator PC IP address 52 in the print process stop notice 50 and proceeds onto S37.

In S37, the printing restriction information notifying part 34 which has received the printing restriction message notification request 70 creates the printing restriction message notice 60 by setting the IP address 30*ad* of the administrator PC 30 to the administrator PC IP address 61 of the printing restriction message notice 60 shown in FIG. 4, setting the printing restriction message 81 in the printing restriction information list 80 in the printing restriction information holding part 32 to the printing restriction message 62, setting the restriction method 82 to the restriction method 63, and setting the new addition 83 to the new addition 64, respectively; sends the printing restriction message notice 60 to the printing restriction information receiving part 11 of the image forming apparatus 10 specified by the image forming apparatus IP address 72 of the printing restriction message notification request 70; and proceeds onto S38.

In S38, the printing restriction information receiving part 11 receives the printing restriction message notice 60, requests the printing restriction information holding part 12 to update the printing restriction information list 80, requests the administrator PC information holding part 18 to update the administrator PC list 130, and proceeds onto S39.

In S39, the printing restriction information holding part 12 which has receiving the update request creates the printing restriction information list 80 by setting the printing restriction message 62 of the printing restriction message notice 60 to the printing restriction message 81 in the printing restriction information list 80 shown in FIG. 6, setting the restriction method 63 to the restriction method 82, and setting the new addition 64 to the new addition 83, respectively. The administrator PC information holding part 18 which has received the update request sets the administrator PC IP address 61 of the printing restriction message notice 60 to the administrator PC IP address 131 in the administrator PC list 130, and proceeds onto S40.

In S40, the printing restriction information receiving part 11 notifies the print image generating part 14 that the printing restriction information has been updated. The print image generating part 14 resumes accepting new print jobs 90 and proceeds onto S41.

In S41, the print image generating part 14 judges whether stopped print jobs 90 exist. If there are no stopped print jobs 90 (No), this process is finished. If there are stopped print jobs 90 (Yes), S42 is taken.

In S42, the print image generating part 14 checks the print job in-analysis flag 14*a*. If the print job in-analysis flag 14*a* is "OFF state" (No), S43 is taken. In S43, the print job image generating part 14 sets the print job in-analysis flag 14*a* to "ON state", instructs the printing restriction message judging part 15 to perform print job message analysis on only newly-added printing restriction messages, and proceeds onto S44.

In S44, the printing restriction message judging part 15 acquires printing restriction messages 81 whose new addition 83 is set to "Y" in the printing restriction information list 80 from the printing restriction information holding part 12, and proceeds onto S45.

In S45 the printing restriction message judging part 15 performs an analysis whether the printing restriction messages 81 acquired from the printing restriction information holding part 12 are contained in the print data 95 of the print job 90. When the analysis whether the printing restriction messages 81 are contained in the print data 95 of the print job 90 is completed, S6 in FIG. 20 is taken. Below, a process shown in FIG. 20 is executed.

In the S42, if the print job in-analysis flag 14*a* is "ON state" (Yes), S46 is taken. In S46, the print job image generating part 14 instructs the printing restriction message judging part 15 to perform print job message analysis on all the printing restriction messages 81. The printing restriction message judging part 15 acquires all the printing restriction messages 81 in the printing restriction information list 80 from the printing restriction information holding part 12, and proceeds onto S47.

In S47, the printing restriction message judging part 15 performs an analysis whether the printing restriction messages 81 acquired from the printing restriction information holding part 12 are contained in the print data 95 of the print job 90, and proceeds onto S6 in FIG. 20.

(Advantages of First Embodiment)

The image forming apparatus 10 and the image forming system in this the first embodiment have the following advantages (1)-(3).

(1) Because whether image generation is allowed or not is judged before generating images based on the print job 90 by analyzing whether the printing restriction messages 81 are contained in the print data 95 of the print job 90 using the printing restriction message judging part 15, confidential information can be securely prevented from being leaked.

(2) The image generation process in the print image generating part 14 is stopped in updating the printing restriction messages 81, and the stopped image generation process is resumed after finishing the update of the printing restriction messages 81. Therefore, addition, change, deletion, and the like of the printing restriction messages become possible at any timing. Therefore, confidential information can be flexibly controlled.

(3) After updating the printing restriction messages 81, whether the pre-updating analyzing/judging processes of the print jobs 90, whose image generation processes are stopped by the print image generating part 14 are completed, is judged. If they are complete, the analyzing/judging process is executed only for the printing restriction messages 81 which have been updated for the restriction information judging part 15. If they are not complete, the analyzing/judging process is executed for all the printing restriction messages 81 in the printing restriction list 80 held in the restriction information holding part 12 for the restriction information judging part 15. Therefore, the analyzing/judging processes of the printing restriction messages 81 can be executed speedily and securely.

Second Embodiment

Construction of Second Embodiment

Figure 23:
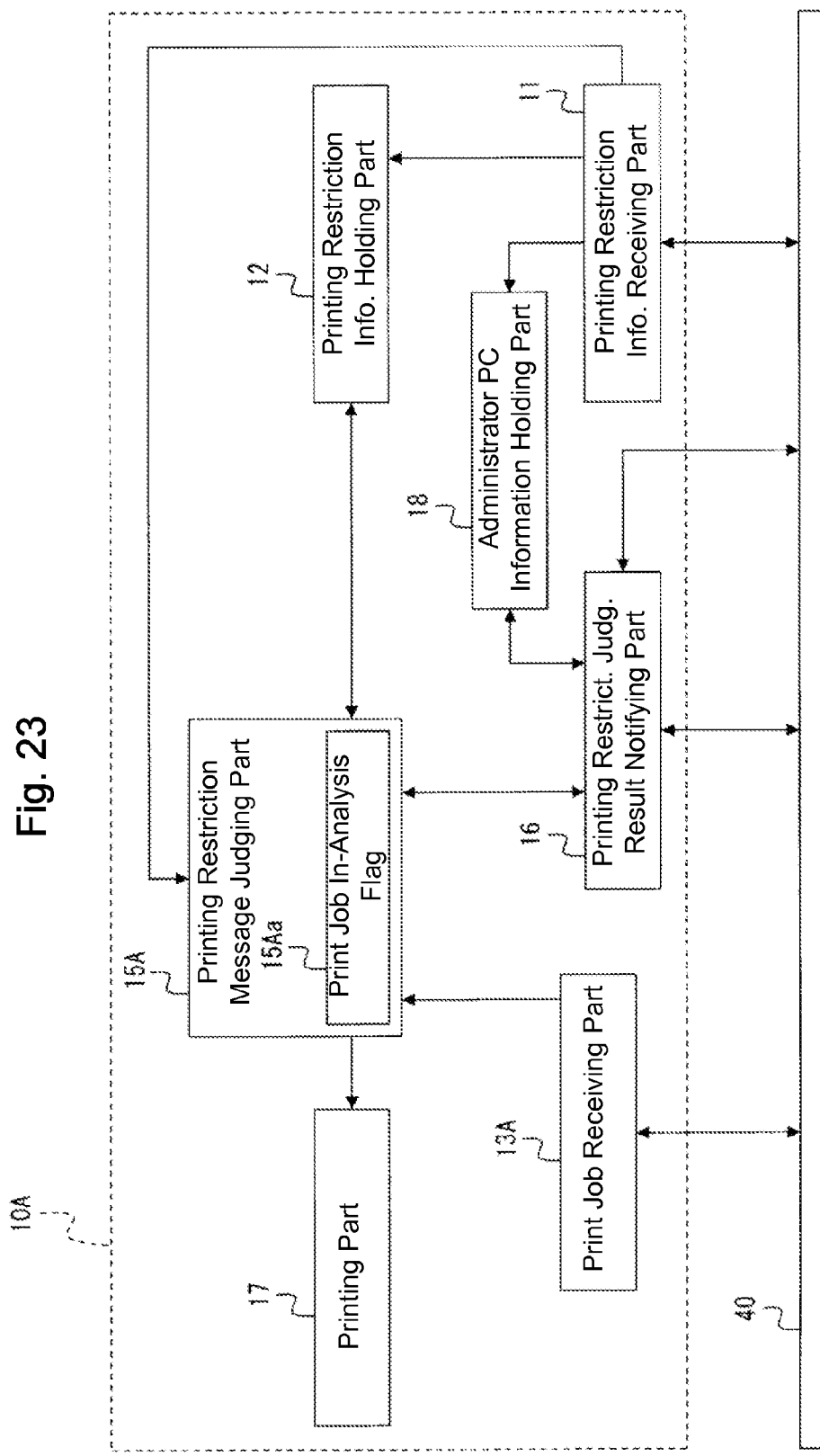
FIG. 23 is a block diagram showing an image forming apparatus in a second embodiment of the present invention.
Figure 24:
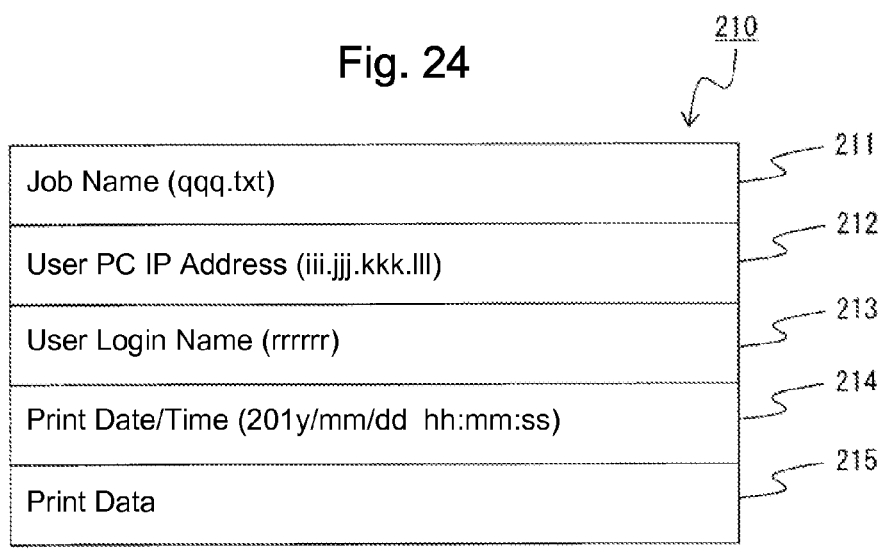
FIG. 24 is a diagram showing a file for analyzing printing restriction messages received by the print job receiving part in FIG. 23.
Figure 25:
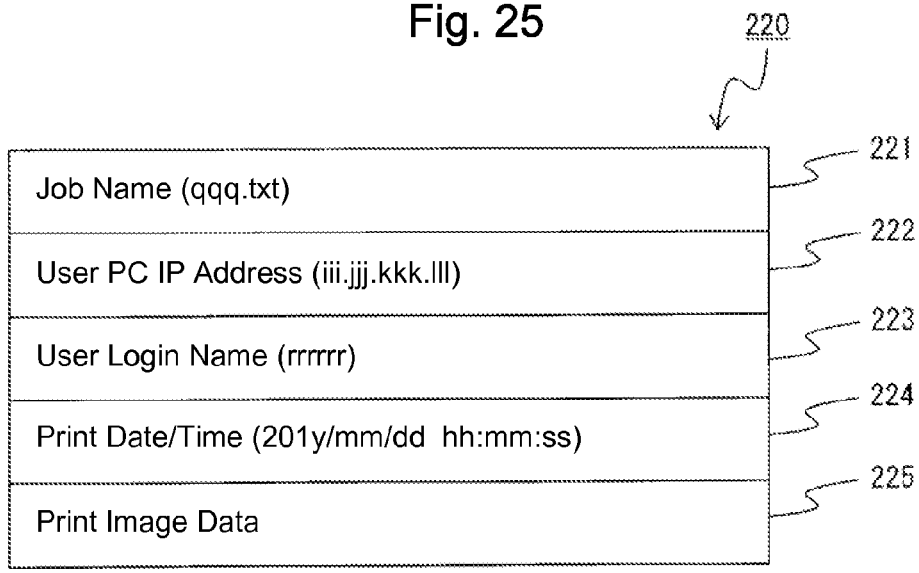
FIG. 25 is a diagram showing a print job in the second embodiment of the present invention.

FIG. 23 is a block diagram showing an image forming apparatus 10A in a second embodiment of the present invention. Common symbols are given to the elements which are common with the elements in FIG. 1 showing the first embodiment. FIG. 24 is a diagram showing a printing restriction message analysis file 210 received by a print job receiving part 13A in FIG. 23. Further, FIG. 25 is a diagram showing a print job 220 in the second embodiment of the present invention.

The construction of the image forming apparatus 10A will be explained using FIG. 23 referring to FIGS. 24 and 25.

The image forming apparatus 10A in this the second embodiment differs from the one in the first embodiment in having the print job receiving part 13A which is different from the print job receiving part 13 in the first embodiment and a printing restriction message judging part 15A which is different from the printing restriction message judging part 15 in the first embodiment, and having the print image generating part 14 in the first embodiment removed. The rest of the construction is the same as in the first embodiment.

The print job receiving part 13A which is different from the one in the first embodiment has a function to receive a print job 220 which is sent from a user PC 20 and is different from the one in the first embodiment, and also receive the printing restriction message analysis file 210 as the file shown in FIG. 24.

The printing restriction message judging part 15A which is different from the one in the first embodiment has a function to judge whether there are printing restriction messages 81 registered in the printing restriction information list 80 in print data 215 of the printing restriction message analysis file 210 received by the print job receiving part 13A. Further, the printing restriction message judging part 15A has a function to request a printing part 17 to print when the print job 220 shown in FIG. 25 is received.

In addition, the printing restriction message judging part 15A has a function to stop an analyzing/judging process for the printing restriction message analysis file 210 and a process for the print job 220 when the printing restriction information receiving part 11 has received the print process stop notice 50.

The printing restriction message judging part 15A has a print job in-analysis flag 14aA having "OFF state" as the default value.

The printing restriction message analysis file 210 shown in FIG. 24 has a job name 211 (such as qqq.txt) which becomes the target of printing, a user PC IP address (such as iii.jjj.kkk.lll), a user login name (rrrrrr), a print date/time (201y/mm/dd hh:mm:ss), and print data 215.

The print job 220 shown in FIG. 25 has a job name, a user PC IP address 222, a user login name 223, a print date/time 224, and print image data 225 generated based on the print data 215, which are similar to those in the printing restriction message analysis file 210.

Figure 26:
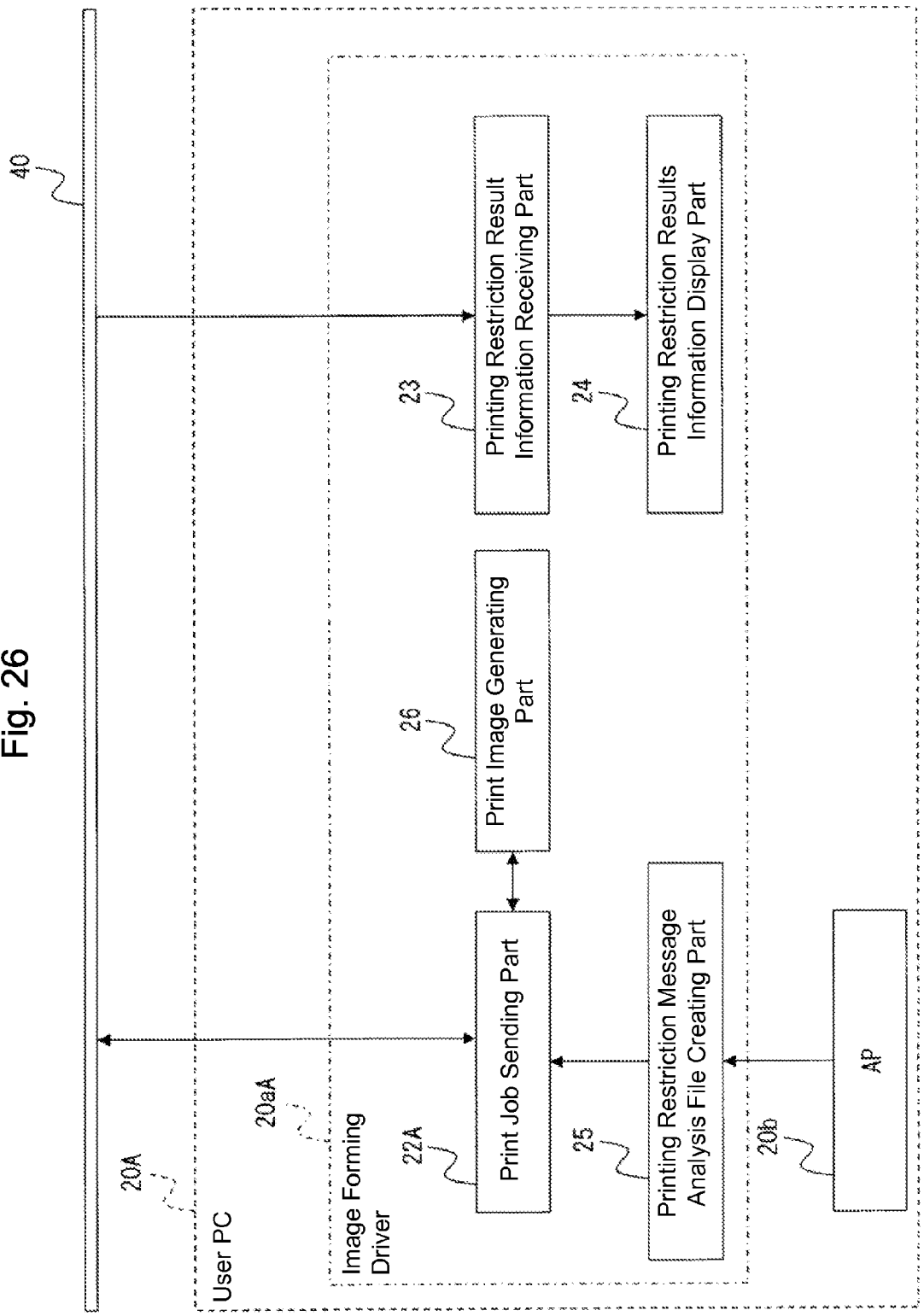
FIG. 26 is a block diagram showing a user PC in the second embodiment of the present invention.
Figure 27:
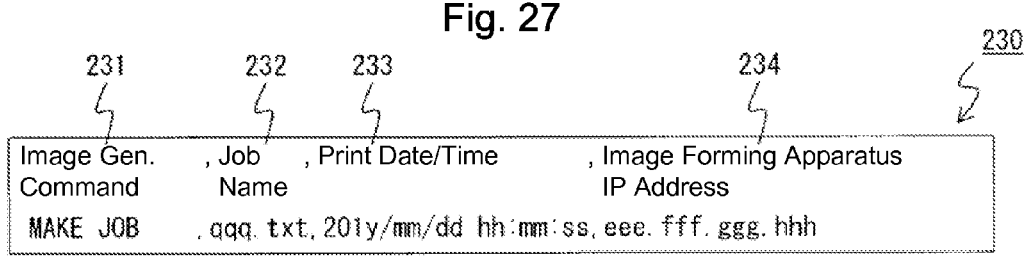
FIG. 27 is a diagram showing content example of the print image generation request notice sent to the user PC from the image forming apparatus in the second embodiment of the present invention.
Figure 28:
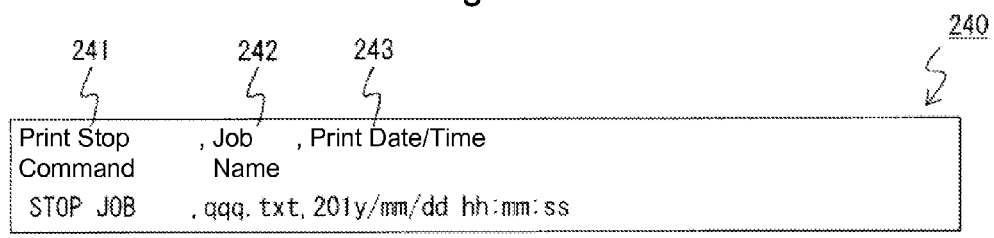
FIG. 28 is a diagram showing content example of the print process cancellation request notice sent to the user PC from the image forming apparatus in the second embodiment of the present invention.

FIG. 26 is a block diagram showing the user PC 20 in the second embodiment of the present invention. FIG. 27 is a diagram showing a content example of the print image generation request notice 230 sent to the user PC 30 from the image forming apparatus 10A in the second embodiment of the present invention. Further, FIG. 28 is a diagram showing a content example of the print process stop request notice 230 sent to the user PC 30 from the image forming apparatus 10A in the second embodiment of the present invention.

The construction of the image forming apparatus 10A will be explained using FIG. 26 while referring to FIGS. 27 and 28.

The user PC 20 has an image forming driver 20aA which is different from the one in the first embodiment, and AP 20b which is the subject of printing execution similar to the one in the first embodiment.

In the image forming driver 20aA the print job processing part 21 shown in FIG. 12 of the first embodiment is omitted. The image forming driver 20aA has a print job sending part 22A which is different from the one in the first embodiment, and a printing restriction message analysis file creating part 25 as a file creating part and a print image generating part 26 are added. The rest of the construction is the same as in the first embodiment.

The printing restriction message analysis file creating part 25 has a function to create the printing restriction message analysis file 210 based on a print request from AP 20b and to request the print job sending part 22A to send the printing restriction message analysis file 210. The print job sending part 22A has a function to send the printing restriction message analysis file 210 and the print job 220 to the image forming apparatus 10A. Further, the print job sending part 22A receives the print image generation request notice 230 and the print job stop request notice 240 sent from the image forming apparatus 10A.

The print image generating part 26 has a function to receives the print image generation request notice 230 received by the print job sending part 22A, to create the print job 220 by converting printing target data into print image data, and to request the print job sending part 22A to send the print job 220.

The print image generation request notice 230 shown in FIG. 27 has an image generation command 231 having a fixed message "MAKE JOB", a job name 232 (such a qqq.txt), a print date/time 233 (such as 201y/mm/dd hh:mm:ss), and an image forming apparatus IP address 234 (such as eee.f-ff.ggg.hhh).

The print process stop request notice 240 shown in FIG. 28 has a print stop command 241 having a fixed message "STOP JOB", a job name 242 (such a qqq.txt), and a print date/time 243 (such as 201y/mm/dd hh:mm:ss).

(Actions of Second Embodiment)

Figure 29:
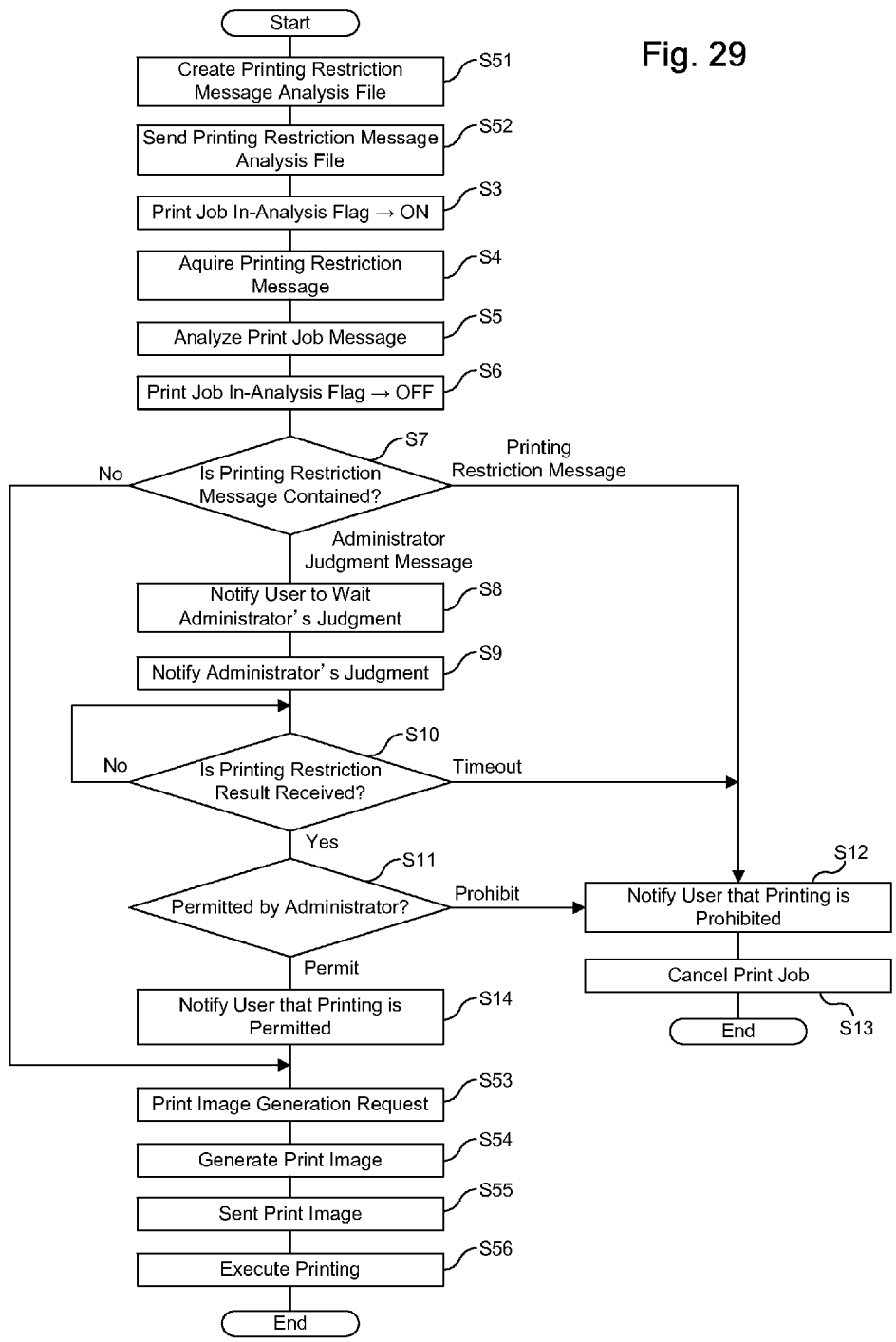
FIG. 29 is a flow diagram showing the print process actions of an image forming system in the second embodiment of the present invention.

FIG. 29 is a flow diagram showing the print process actions of an image forming system in the second embodiment of the present invention, wherein common codes are given to the steps which are common with the steps in FIG. 20 showing the first embodiment.

In FIG. 29, S51-56 are different from those in the first embodiment, and S3-14 are the same with those in the first embodiment.

In S51, when printing execution is instructed by AP 20b of the user PC 20A, the printing restriction message analysis file creating part 25 generates the printing restriction message analysis file 210 comprised of comprised of a job name 211, a user PC IP address 212 with the IP address 20ad of the user PC 20A set, a user login name 213, a print date/time 214, and print data 215, and proceeds onto S52.

In S52, the generated printing restriction message analysis file 210 is set to the print job receiving part 13A of the image forming apparatus 10A by the print job sending part 22A. The print job receiving part 13A outputs the printing restriction message analysis file 210 to the printing restriction message judging part 15A and proceeds onto S3.

In S3 to S14 which are the same as in the first embodiment, the same processes as in the first embodiment are executed by regarding the printing restriction message analysis file 210 as the print job 90 in the first embodiment.

In S7, which is similar to the on in the first embodiment, the printing restriction message judging part 15A judges the result of the analysis. As a result of the analysis, if the printing restriction messages 81 are contained in the print data 215 of the printing restriction message analysis file, and if the contained printing restriction messages 81 include one with restriction method 82 set to "Unprintable", S12 which is the same as in the first embodiment is taken. If the printing restriction messages 81 are contained in the print data 215 of the printing restriction message analysis file 210, and if the contained printing restriction messages 81 include one with the corresponding restriction method 82 set to "Administrator's Judgment", S8 which is the same as in the first embodiment is taken. As a result of the analysis, if the printing restriction messages 81 are not contained in the print data 215 of the printing restriction message analysis file 210, S14 which is the same as the one in the first embodiment is executed, and S53 which is different from the one in the first embodiment is taken.

In S53, the printing restriction message judging part 15A requests the print job receiving part 13A to send the print image generation request notice 230 shown in FIG. 27, and the print job receiving part 13A creates the print image generation request notice 230 by setting the job name 211 of the printing restriction message analysis file 210 to the job name 232 of the print image generation request notice 230, setting the print date/time 214 to the print date/time 233, and setting the IP address 10d of the image forming apparatus 10A to the image forming address IP address 234, respectively, and sends it to the print job ending part 22A of the user PC 20A specified by the user PC IP address 212 of the printing restriction message analysis file 210.

In S54, the print job sending part 22A which has received the print image generation request notice 230 requests the print image generating part 26 to generate print images, and the print image generating part 26 performs an image generation process based on the printing restriction message analysis file 210, generates a print job 220 comprised of a job name 221, a user PC IP address 222, a user login name 223, a print date/time 224, and print image data 225, and proceeds onto S55.

In S55, the print image generating part 26 requests the print job sending part 22A to send the print job 220, and the print job sending part 22A sends the print job 220 to the print job receiving part 13A of the image forming apparatus 10A specified by the image forming apparatus IP address 234 of the print image generation request notice 230 and proceeds onto S56.

In S56, the print job receiving part 13A which has received the print job 220 outputs the print job 220 to the printing restriction message judging part 15A. If there is no stopped print job, the printing restriction message judging part 15A request the printing part 17 to print the print job 220. The printing part 17 performs printing of the print job 220 and finishes this process.

Figure 30:
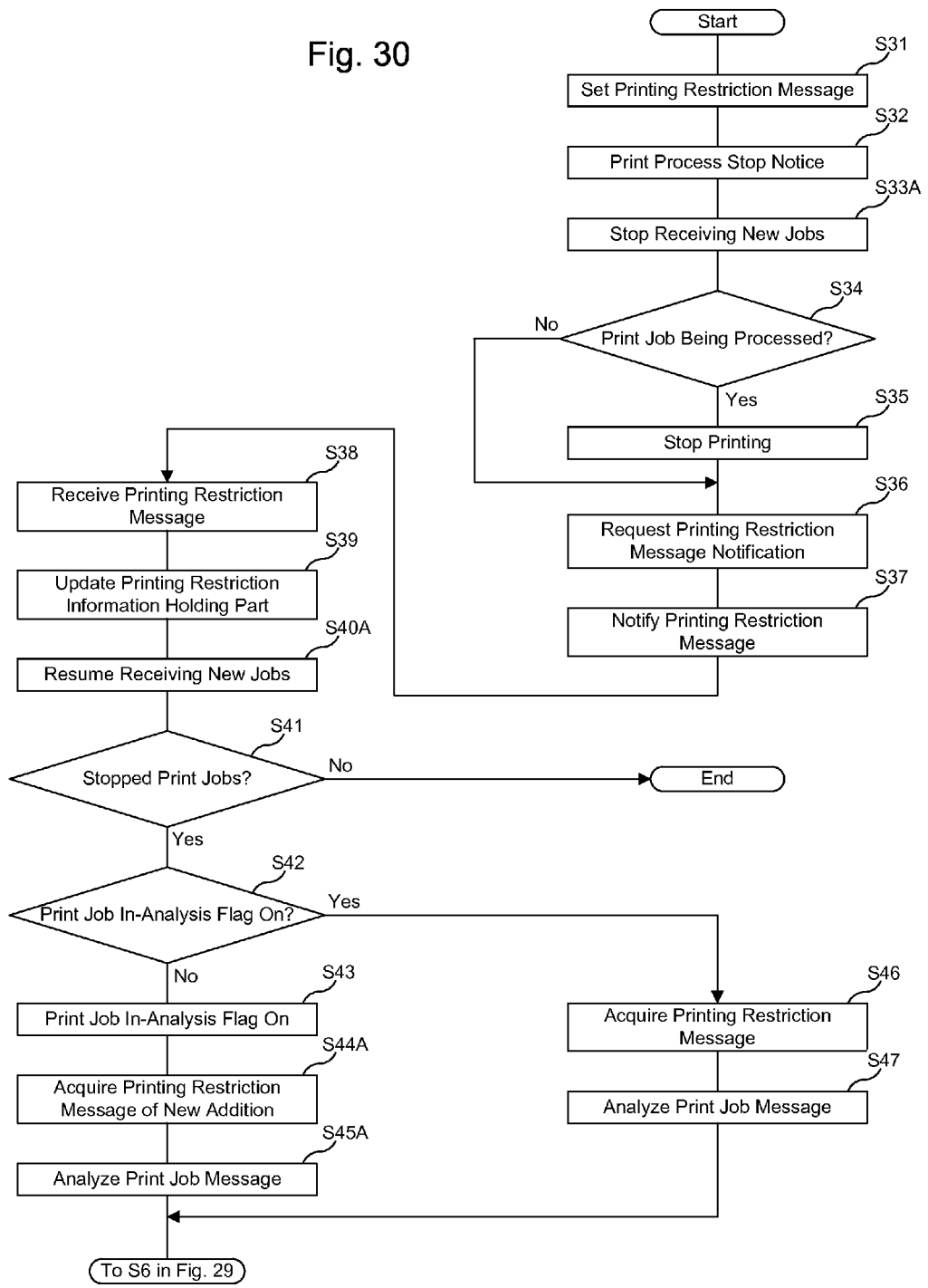
FIG. 30 is a flow diagram showing the actions in changing the printing restriction message setting of the image forming system in the second embodiment of the present invention.

FIG. 30 is a flow diagram showing actions in changing the printing restriction message setting of the image forming system in the second embodiment of the present invention, wherein common symbols are given to the elements which are common with the elements in FIG. 22 showing the first embodiment In the same manner as in the first embodiment, a printing restriction message setting change is performed in S31, a print process stop process is executed in S32, and S33A is taken.

In S33A, which is different from the one in the first embodiment, the printing restriction information receiving part 11 which has received the print process stop notice 50 requests the printing restriction message judging part 15A to stop accepting new jobs, and the printing restriction message judging part 15A stops accepting new printing restriction message analysis files 210 and new print jobs 220 and proceeds onto S34.

In the same manner as in the first embodiment, the process of judging whether there are print jobs 220 in processing in S34, the stop printing process in S35, the printing restriction message notification requesting process in 36, the printing restriction message notification process in S37, the printing restriction message receiving process in S38, and the printing restriction information holding part 12 updating process in S39 are executed, and S40A is taken.

In S40A, which is different from the one in the first embodiment, the printing restriction information receiving part 11 notifies the printing restriction message judging part 15A that the printing restriction information has been updated. The printing restriction message judging part 15A resumes receiving new printing restriction message analysis files 210 and new print jobs 220, and proceeds onto S41.

In the same manner as in the first embodiment, the process of judging whether there are stopped print jobs 220 in S41, and the process of judging ON/OFF of the print job in-analysis flag 15Aa in S42 are executed. In S42, if the print job in-analysis flag 15Aa is "ON state" (Yes), the printing restriction message acquiring process in S46 and the print job message analyzing process in S47 are executed in the same manner as in the first embodiment, and S6 in FIG. 29 is taken.

In S42, if the print job in-analysis flag 15Aa is "OFF state" (No), S43 which is the same as in the first embodiment is executed, and S44A is taken.

In S44A, which is different from the one in the first embodiment, the printing restriction message judging part 15A acquires printing restriction messages 81 with the new addition 83 set to "Y" in the printing restriction information list 80 from the printing restriction information holding part 12 and proceeds onto S45A. In S45A, the printing restriction message judging part 15A performs an analysis whether the printing restriction messages 81 acquired from the printing restriction information holding part 12 are contained in the print data 215 in the printing restriction message analysis file 210 and proceeds onto S6 in FIG. 29.

(Advantages of Second Embodiment)

According to this the second embodiment, in addition to the advantages of the first embodiment, even if a process of generating print images is performed by a user PC 20A, new restriction information can be applied to the print job 220 which was in printing when the restriction information was changed. Therefore, confidential information leak prevention of higher precision becomes possible.

(Modifications)

The present invention is not limited to the first and second embodiments, but other various utilization and modifications are possible. As these utilization and modifications, the following (a)-(c) exist for example.

(a) Although an electrophotographic color page printer was explained as an example of the image forming apparatus 10 and 10A in the first and second embodiments, the present invention is not limited to this but can be a monochromatic page printer, a facsimile machine, a copier, an Multi-Function Printer/Product/Peripheral (MFP) and the like.

(b) Although a job was generated by the user PC 20 or 20A in the explanations of the first and second embodiments, a job may be generated by reading image data by a scanner, and image data may be received by a facsimile machine to generate a job, for example.

(c) Although restriction information was generated in the administrator PC 30 in explaining the restriction information generating part in the first and second embodiments, the printing restriction information in the printing restriction information holding part 12 may be updated by inputting the printing restriction information from an operating part (not shown) of the image forming apparatus 10 or 10A for example.

What is claimed is:

1. An image forming apparatus, comprising:
   a job receiving part that is configured to receive a job for image formation, the job including image data;
   an image printing part that is configured to perform an image print process based on the image data of the job received by the job receiving part;
   a restriction information holding part that is configured to hold restriction information to restrict the image print process; and
   a restriction information judging part that is configured to execute an analyzing/judging process in which whether or not the image print process is allowed is determined by analyzing whether or not specific information corresponding to the restriction information is contained in the image date of the job based on the restriction information held in the restriction information holding part, wherein
   after update of the restriction information, the image generating part judges whether or not the job which is being processed has completed the analyzing/judging process before the update,
   if the analyzing/judging process has been completed, the restriction information judging part executes the analyzing/judging process only for the restriction information that was updated.

2. The image forming apparatus according to claim 1, further comprising:
   a restriction information receiving part that is configured to receive an update request of the restriction information, to output a stop request of the image print process for the job to the image printing part, and to output an update request of the restriction information to the restriction information holding part, wherein
   the image printing part, based on the stop request, stops the image print process, stops accepting new jobs and instructs the restriction information judging part to stop the analyzing/judging process, and
   the restriction information holding part, based on the update request, updates the restriction information.

3. The image forming apparatus according to claim 2, wherein
   after the update of the restriction information, the image printing part judges whether or not the job in which the image print process is stopped has completed the analyzing/judging process before the update,
   if the analyzing/judging process has been completed, the restriction information judging part executes the analyzing/judging process only for the restriction information that was updated, and
   if the analyzing/judging process has not been completed, the restriction information judging part executes the analyzing/judging process for the restriction information that is held in the restriction information holding part.

4. The image forming apparatus according to claim 2, further comprising:
   a job generating part that is configured to generate the job and to output the job to the job receiving part; and
   a restriction information generating part that is configured to generate the restriction information and to output the restriction information to the restriction information receiving part.

5. An image forming system, comprising:
   the image forming apparatus according to claim 1;
   a first information processor that is configured to generate the job and to output the job to the image forming apparatus; and
   a second information processor that is configured to generate the restriction information and to output the restriction information to the image forming apparatus.

6. The image forming system according to claim 5, wherein
   the image forming apparatus is comprised of a plurality of the image forming apparatuses according to claim 1,
   the second information processor includes a printing restriction information notifying part that sends an update request for the restriction information to each of the plurality of image forming apparatuses after notifying the plurality of the image forming apparatuses of a print process stop command.

7. The image forming system according to claim 5, further comprising:
   a judgment result notifying part that is configured to notify the first information processor or the second information processor of the judgment result, based on the judgment result of the restriction information judging part.

8. The image forming system according to claim 7, wherein
   the first information processor includes
   a job processing part that is configured to process processing target data and to generate the job;
   a job sending part that is configured to send the job to the image forming apparatus;

a judgment result receiving part that is configured to receive the judgment result notified from the judgment result notification part; and a judgment result display part that is configured to display a first message based on the judgment result.

9. The image forming system according to claim 7, wherein the second information processor includes:

a restriction setting part that is configured to set the restriction information and address information of the image forming apparatus to which the restriction information is sent;

a restriction information holding part that is configured to hold the set restriction information;

a restriction information notifying part that is configured to notify the image forming apparatus of the restriction information based on the address information; and a restriction judging part that is configured to receive the judgment result notified from the judgment result notifying part.

10. The image forming system according to claim 9, wherein the restriction judging part prompts an input of judgment on whether to allow the image formation by displaying a second message based on the judgment result received from the judgment result notifying part, and if the judgment on whether to allow the image formation is inputted, the judgment on whether to allow the image print process is sent to the image forming apparatus.

11. The image forming system according to claim 10, wherein the judgment result notifying part receives the judgment on whether to allow the image print process and notifies the restriction information judging part of the judgment on whether to allow the image print process, and the restriction information judging part decides whether to allow generating the image based on the judgment on whether to allow the image print process.

12. The image forming system according to claim 9, wherein the restriction information receiving part has a function to send the restriction information notification request to the second information processor, and the restriction information notifying part has a function to generate the restriction information and to send the restriction information to the restriction information receiving part by receiving the restriction information notification request.

13. The image forming apparatus according to claim 1, wherein the restriction information judging part performs a process to add a restriction item more preferentially than a print process for the print job stored before receiving an update request for the restriction information if a new addition of the restriction item is included in the update request of the restriction information.

14. The image forming apparatus according to claim 13, wherein the restriction information judging part analyzes whether or not the restriction item for the update request of the restriction information is included in the print job stored before receiving the update request of the restriction information if the new addition of the restriction item is included in the update request of the restriction information.

15. An image forming system, comprising:

an information processor that is configured to generate and to output a file for a restriction information analysis and a job for an image forming, the job including image data; and an image forming apparatus that is configured to receive the file and the job and to form an image based on the image data of the job, wherein the information processor includes
 a file creating part that is configured to generate the file based on processing target data,
 an image generating part that is configured to generate the job by performing an image print process on the processing target data, and
 a job sending part that is configured to send the file and the job to the image forming apparatus, and the image forming apparatus includes
 a job receiving part which receives the file and the job sent from the information processor,
 a restriction information holding part that is configured to hold restriction information from the received file to restrict the image forming process, and
 a restriction information judging part that is configured to analyze whether or not specific information corresponding to the restriction information exists in the file and to judge whether or not to request the information processor to process the image data of the job based on the restriction information held in the restriction information holding part, these analyzing and judging being defined as an analyzing/judging process;

after update of the restriction information, the image generating part judges whether or not the job which is being processed has completed the analyzing/judging process before the update, if the analyzing/judging process has been completed, the restriction information judging part executes the analyzing/judging process only for the restriction information that was updated.

16. The image forming system according to claim 15, wherein the job receiving part has a function to send a job requesting notice which requests the generation of the job to the information processor based on the judgment result of the restriction information judging part.

17. An image forming apparatus, comprising:

a job receiving part that is configured to receive a job for image formation;

an image printing part that is configured to perform an image print process based on the job received by the job receiving part;

a restriction information holding part that is configured to hold restriction information to restrict the image print process; and a restriction information judging part that is configured to execute an analyzing/judging process in which whether or not the image print process is allowed is determined by analyzing whether or not specific information is contained in the job based on the restriction information held in the restriction information holding part, a restriction information receiving part that is configured to receive an update request of the restriction information, and to output an update request of the restriction information to the restriction information holding part, wherein the restriction information holding part, based on the update request, updates the restriction information, and after the update of the restriction information, the image printing part judges whether or not the job which is being processed has completed the analyzing/judging process before the update, if the analyzing/judging process has been completed, the restriction information judging part executes the analyzing/judging process only for the restriction information that was updated, and if the analyzing/judging process has not been completed, the restriction information judging part executes the analyzing/judging process for the restriction information that is held in the restriction information holding part.

\* \* \* \* \*